(12) United States Patent
Fang et al.

(10) Patent No.: US 10,584,201 B2
(45) Date of Patent: Mar. 10, 2020

(54) METHANESULFONIC ACID MEDIATED SOLVENT FREE SYNTHESIS OF CONJUGATED POROUS POLYMER NETWORKS

(71) Applicant: The Texas A&M University System, College Station, TX (US)

(72) Inventors: Lei Fang, College Station, TX (US); Zi-Hao Guo, College Station, TX (US); Chenxu Wang, College Station, TX (US); Qiang Zhang, Pullman, WA (US); Hong-Cai Zhou, College Station, TX (US)

(73) Assignee: The Texas A&M University System, College Station, TX (US)

( * ) Notice: Subject to any disclaimer, the term of this patent is extended or adjusted under 35 U.S.C. 154(b) by 55 days.

(21) Appl. No.: 15/863,095

(22) Filed: Jan. 5, 2018

(65) Prior Publication Data

US 2018/0194891 A1 Jul. 12, 2018

Related U.S. Application Data

(60) Provisional application No. 62/444,479, filed on Jan. 10, 2017.

(51) Int. Cl.
*C08G 61/10* (2006.01)
*B01J 20/26* (2006.01)
(Continued)

(52) U.S. Cl.
CPC ........... *C08G 61/10* (2013.01); *B01D 15/165* (2013.01); *B01D 67/0006* (2013.01);
(Continued)

(58) Field of Classification Search
CPC ........ C08G 61/10; C08G 61/12; C08G 61/02; C08G 2261/11; C08G 2261/40;
(Continued)

(56) References Cited

U.S. PATENT DOCUMENTS 5,837,752 A * 11/1998 Shastri .................... A61L 27/26
523/116
6,248,469 B1 * 6/2001 Formato ............ B01D 67/0088
429/300
(Continued)

OTHER PUBLICATIONS

Bétard, A. et al. (2012) "Metal-Organic Framework Thin Films: From Fundamentals to Applications," *Chemical Reviews* 112(2), 1055-1083.
(Continued)

*Primary Examiner* — Michael Bernshteyn
(74) *Attorney, Agent, or Firm* — Medlen & Carroll, LLP

(57) ABSTRACT

The present disclosure relates to synthesis of porous polymer networks and applications of such materials. The present disclosure relates to a method of fabricating of a porous polymer network comprising: (a) providing: (i) a first reactant comprising a plurality of compounds comprising at least one acetyl group, said plurality of compounds comprising at least one compound type, and (ii) a second reactant comprising an alkylsulfonic acid, and (b) creating a solution of said reactants, (c) casting said solution in a form, and (d) treating said solution under such conditions so as to produce a porous polymer network. In one embodiment, the invention relates to a porous polymer network which has a basic structure selected from the group consisting of (Continued)

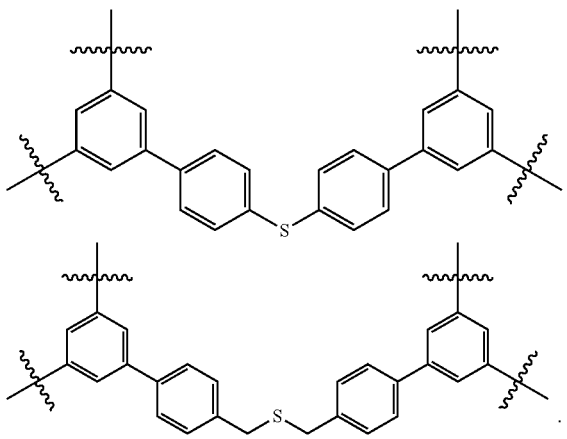

13 Claims, 25 Drawing Sheets

(51) Int. Cl.
B01J 20/20 (2006.01)
B01J 20/28 (2006.01)
B01D 15/16 (2006.01)
B01D 67/00 (2006.01)
C08J 9/28 (2006.01)
C08G 61/12 (2006.01)
B01D 71/06 (2006.01)
B01D 71/44 (2006.01)
C08G 61/02 (2006.01)
B01J 20/30 (2006.01)
B01D 61/02 (2006.01)
B01D 61/14 (2006.01)

(52) U.S. Cl.
CPC ......... *B01D 67/0013* (2013.01); *B01D 71/06* (2013.01); *B01D 71/44* (2013.01); *B01J 20/205* (2013.01); *B01J 20/262* (2013.01); *B01J 20/28045* (2013.01); *B01J 20/28066* (2013.01); *B01J 20/28071* (2013.01); *B01J 20/3071* (2013.01); *B01J 20/3085* (2013.01); *C08G 61/02* (2013.01); *C08G 61/12* (2013.01); *C08J 9/286* (2013.01); *B01D 61/027* (2013.01); *B01D 61/145* (2013.01); *C08G 2261/11* (2013.01); *C08G 2261/12* (2013.01); *C08G 2261/132* (2013.01); *C08G 2261/316* (2013.01); *C08G 2261/344* (2013.01); *C08G 2261/40* (2013.01); *C08J 2201/04* (2013.01); *C08J 2201/0504* (2013.01); *C08J 2365/00* (2013.01); *C08J 2365/02* (2013.01)

(58) Field of Classification Search
CPC .......... C08G 2261/12; C08G 2261/132; C08G 2261/344; B01J 20/262; B01J 20/205; B01J 20/28045; B01J 20/28066; B01J 20/28071; B01J 20/3085; B01J 20/3071; B01D 15/165; B01D 67/0013; B01D 67/006; B01D 67/027; B01D 67/145; B01D 71/06; B01D 71/44
USPC ........................................................ 521/27
See application file for complete search history.

(56) References Cited

U.S. PATENT DOCUMENTS

2004/0197387 A1* 10/2004 Gebhard .............. C08J 5/18
424/443
2015/0190799 A1* 7/2015 Kanatzidis ............... B01J 41/13
428/402

OTHER PUBLICATIONS

Bisbey, R. P. et al. (2016) "Two-dimensional Covalent Organic Framework Thin Films Grown in Flow," *Journal of the American Chemical Society* 138(36), 11433-11436.
Cao, X.-Y. et al. (2003) "Extended π-conjugated dendrimers based on truxene," *Journal of the American Chemical Society* 125(41), 12430-12431.
Chen, L. et al. (2010) "Light-harvesting conjugated microporous polymers: rapid and highly efficient flow of light energy with a porous polyphenylene framework as antenna," *Journal of the American Chemical Society* 132(19), 6742-6748.
Cherioux, F. et al. (2001) "Synthesis and Electrochemical Properties of Novel 1,3,5-Tris(oligothienyl)benzenes: A New Generation of 3D Reticulating Agents," *Advanced Functional Materials* 11(4), 305-309.
Cooper, A. I. (2009) "Conjugated Microporous Polymers," *Advanced Materials* 21(12), 1291-1295.
Elmorsy, S. S. et al. (1991) "The direct production of tri- and hexa-substituted benzenes from ketones under mild conditions," *Tetrahedron Letters* 32(33), 4175-4176.
Feng, X. et al. (2012) "Covalent organic frameworks," *Chemical Society Reviews* 41(18), 6010-6022.
Gernon, M. D. et al. (1999) "Environmental benefits of methanesulfonic acid . Comparative properties and advantages," *Green Chemistry* 1(3), 127-140.
Hsiao, T.-S. et al. (2014) "Molecular design for the highly-sensitive piezochromic fluorophores with tri-armed framework containing triphenyl-quinoline moiety," *Dyes and Pigments* 103, 161-167.
Huang, L. et al. (2003) "Synthesis, morphology control, and properties of porous metal-organic coordination polymers," *Microporous and Mesoporous Materials* 58(2), 105-114.
Jiang, J.-X. et al. (2007) "Conjugated microporous poly(aryleneethynylene) networks," *Angewandte Chemie International Edition* 46(45), 8574-8578.
Jiang, J.-X. et al. (2008) "Synthetic control of the pore dimension and surface area in conjugated microporous polymer and copolymer networks," *Journal of the American Chemical Society* 130(24), 7710-7720.
Jimenez-Solomon, M. F. et al. (2012) "High flux membranes for organic solvent nanofiltration (OSN)—Interfacial polymerization with solvent activation," *Journal of Membrane Science* 423(Supplement C), 371-382.
Jimenez-Solomon, M. F. et al. (2016) "Polymer nanofilms with enhanced microporosity by interfacial polymerization," *Nature Materials* 15(7), 760-767.
Karan, S. et al. (2015) "Sub-10 nm polyamide nanofilms with ultrafast solvent transport for molecular separation," *Science* 348(6241), 1347.
Knopfmacher, O. et al. (2014) "Highly stable organic polymer field-effect transistor sensor for selective detection in the marine environment," *Nature Communications* 5, 2954.
Lee, J. et al. (2009) "Metal-organic framework materials as catalysts," *Chemical Society Reviews* 38(5), 1450-1459.
Li, J.-R. et al. (2009) "Selective gas adsorption and separation in metal-organic frameworks," *Chemical Society Reviews* 38(5), 1477-1504.
Li, J.-R. et al. (2012) "Metal-Organic Frameworks for Separations," *Chemical Reviews* 112(2), 869-932.
Li, Y. et al. (2016) "Synthesis and characterization of a ferrocene-modified, polyaniline-like conducting polymer," *Journal of Applied Polymer Science* 133(13), n/a-n/a.

(56) References Cited

OTHER PUBLICATIONS

Lu, W. et al. (2010) "Porous Polymer Networks: Synthesis, Porosity, and Applications in Gas Storage/Separation," *Chemistry of Materials* 22(21), 5964-5972.

Medina, D. D. et al. (2015) "Room Temperature Synthesis of Covalent-Organic Framework Films through Vapor-Assisted Conversion," *Journal of the American Chemical Society* 137(3), 1016-1019.

Medina, D. D. et al. (2014) "Oriented thin films of a benzodithiophene covalent organic framework," *ACS Nano* 8(4), 4042-4052.

Ray, J. K. et al. (2001) "Molecular recognition: studies on the synthesis of some bis thiophene carboxamide derivatives as ditopic receptors for long chain dicarboxylic acids," *Tetrahedron* 57(33), 7213-7219.

Rose, M. et al. (2011) "A new route to porous monolithic organic frameworks via cyclotrimerization," *Journal of Materials Chemistry* 21(3), 711-716.

Smith, M. B. et al. (2001)*Advanced Organic Chemistry (5th ed.)*, Wiley Interscience, New York.

Song, Q. et al. (2016) "Porous Organic Cage Thin Films and Molecular-Sieving Membranes," *Advanced Materials* 28(13), 2629-2637.

Stobe, C. et al. (2014) "Synthesis, Chiral Resolution, and Absolute Configuration of C2-Symmetric, Chiral 9,9'-Spirobifluorenes," *European Journal of Organic Chemistry* 2014(29), 6513-6518.

Sumida, K. et al. (2012) "Carbon Dioxide Capture in Metal-Organic Frameworks," *Chemical Reviews* 112(2), 724-781.

Villalobos, L. F. et al. (2017) "Cyclodextrin Membranes: Cyclodextrin Films with Fast Solvent Transport and Shape-Selective Permeability (Adv. Mater. 26/2017)," *Advanced Materials* 29(26), 1606641.

Waller, P. J. et al. (2015) "Chemistry of Covalent Organic Frameworks," *Accounts of Chemical Research* 48(12), 3053-3063.

Weber, J. et al. (2008) "Toward stable interfaces in conjugated polymers: microporous poly(p-phenylene) and poly(phenyleneethynylene) based on a spirobifluorene building block," *Journal of the American Chemical Society* 130(20), 6334-6335.

Wisser, F. M. et al. (2014) "Tailoring Pore Structure and Properties of Functionalized Porous Polymers by Cyclotrimerization," *Macromolecules* 47(13), 4210-4216.

Xu, H. et al. (2015) "Stable, crystalline, porous, covalent organic frameworks as a platform for chiral organocatalysts," *Nature Chemistry* 7(11), 905-912.

Xu, Y. et al. (2013) "Conjugated microporous polymers: design, synthesis and application," *Chemical Society Reviews* 42(20), 8012-8031.

Yaghi, O. M. et al. (2003) "Reticular synthesis and the design of new materials," *Nature* 423(6941), 705-714.

Yoon, M. et al. (2012) "Homochiral Metal-Organic Frameworks for Asymmetric Heterogeneous Catalysis," *Chemical Reviews* 112(2), 1196-1231.

Yuan, D. et al. (2011) "Highly stable porous polymer networks with exceptionally high gas-uptake capacities," *Advanced Materials* 23(32), 3723-3725.

Yuan, S. et al. (2010) "Microporous polyphenylenes with tunable pore size for hydrogen storage," *Chemical Communications* 46(25), 4547-4549.

Zhao, Y.-C. et al. (2011) "Thionyl Chloride-Catalyzed Preparation of Microporous Organic Polymers through Aldol Condensation," *Macromolecules* 44(16), 6382-6388.

Zhu, C. et al. (2014) "Mingling Electronic Chemical Sensors with Supramolecular Host-Guest Chemistry," *Current Organic Chemistry* 18(15), 1957-1964.

Zou, Y. et al. (2015) "Solution-Processable Core-Extended Quinacridone Derivatives with Intact Hydrogen Bonds," *Organic Letters* 17(12), 3146-3149.

* cited by examiner

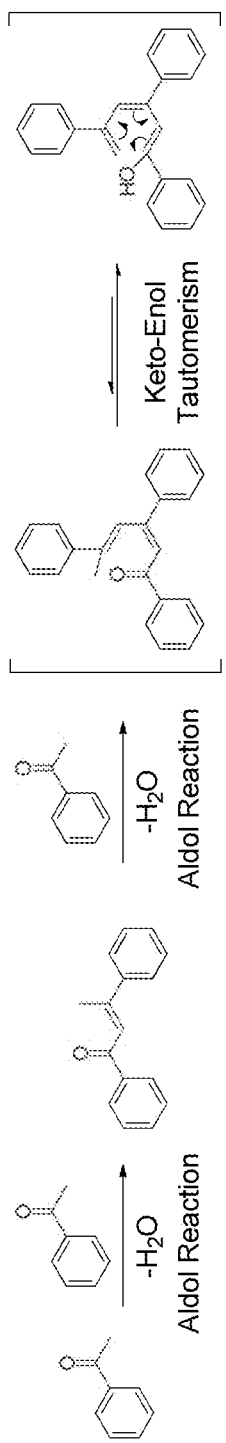
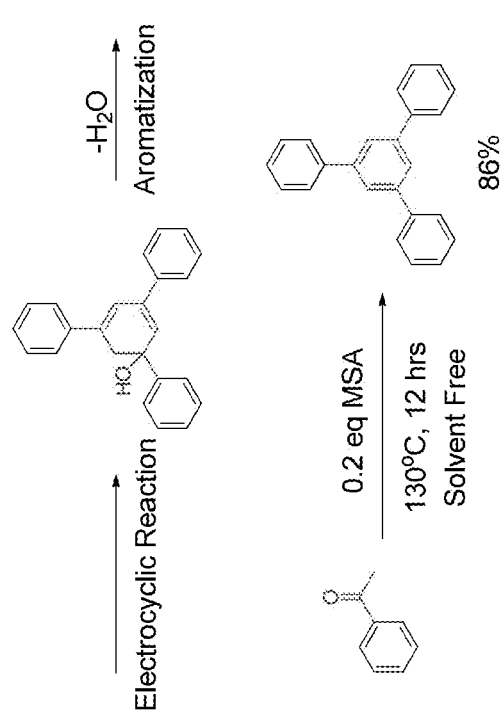
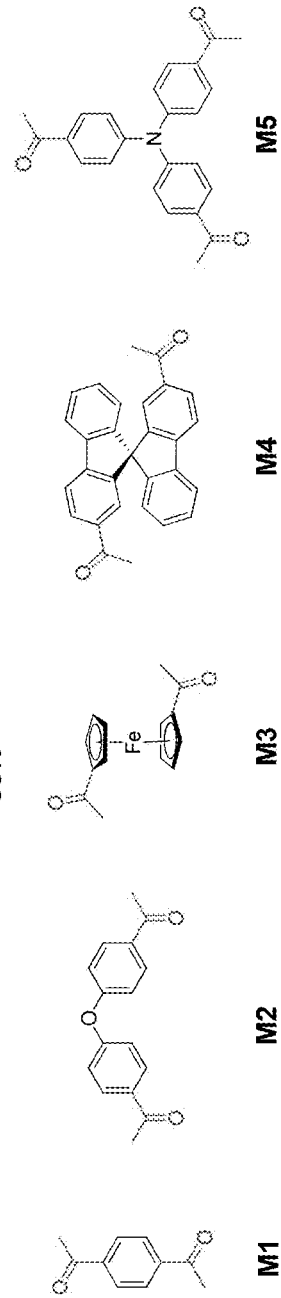
FIG. 1A
FIG. 1B
FIG. 1C

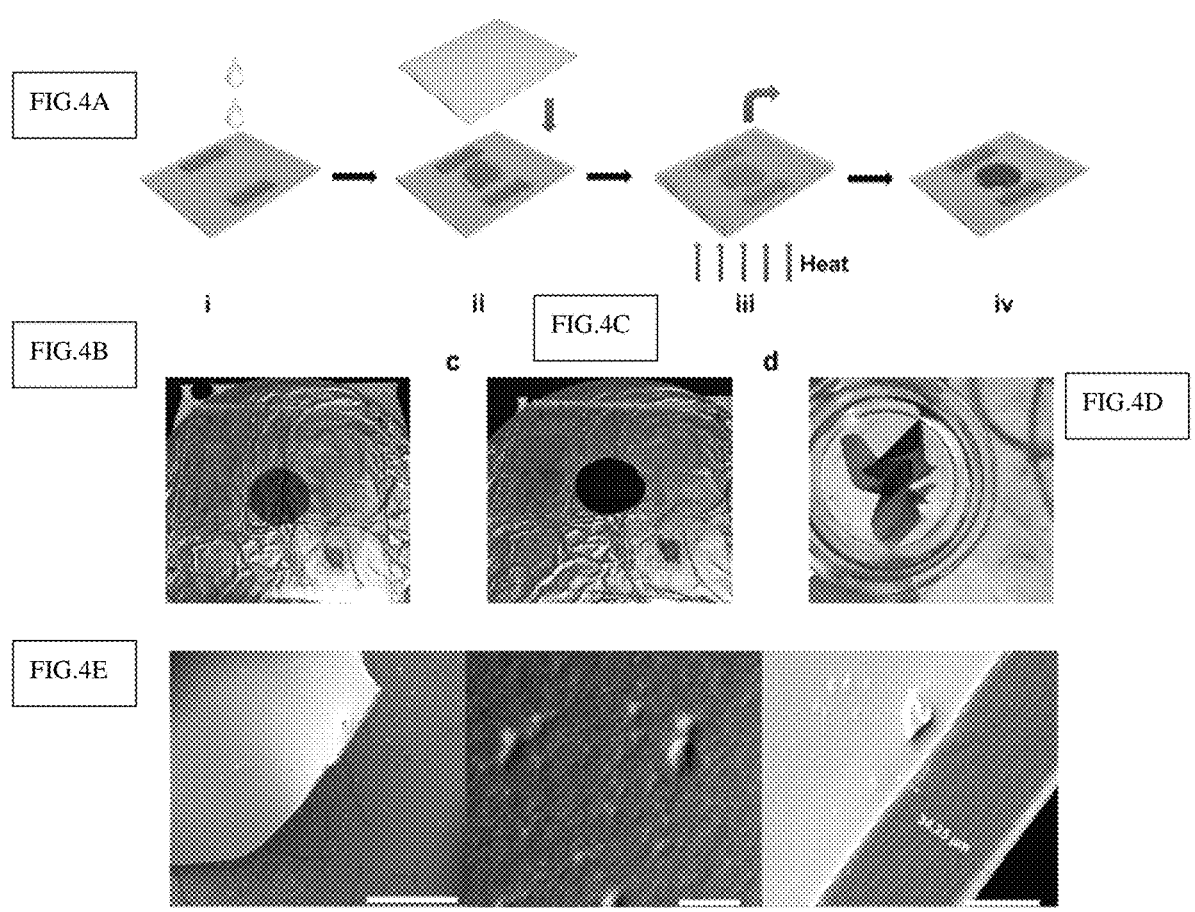
FIGURE 4A - E

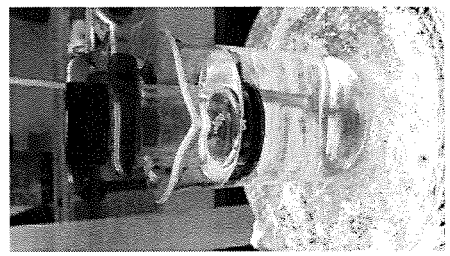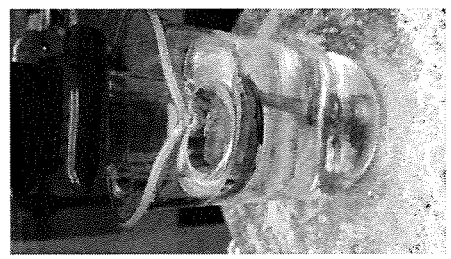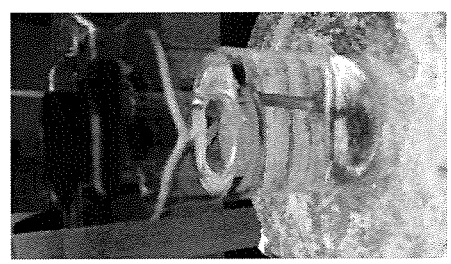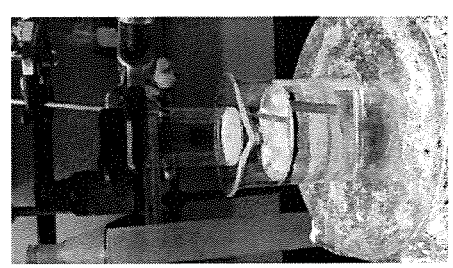
FIGURE 5

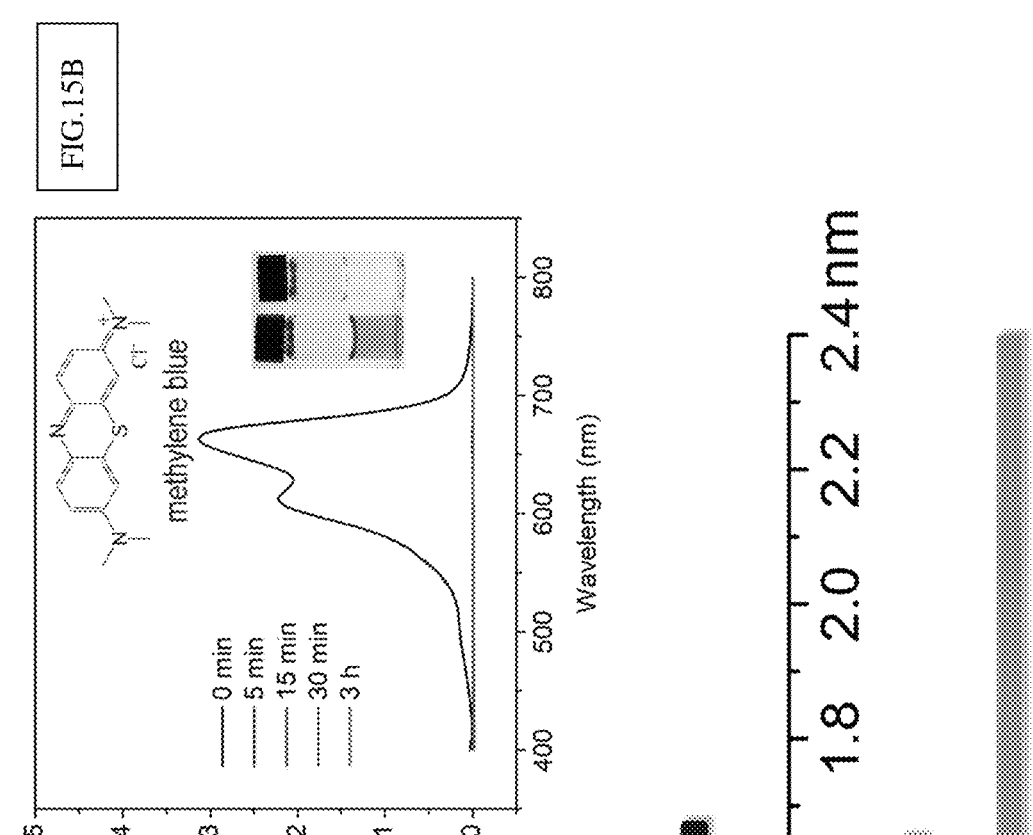
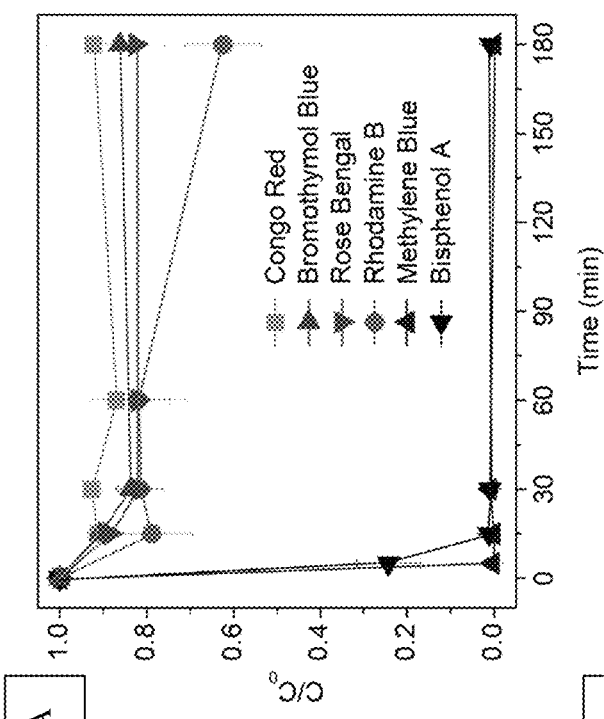
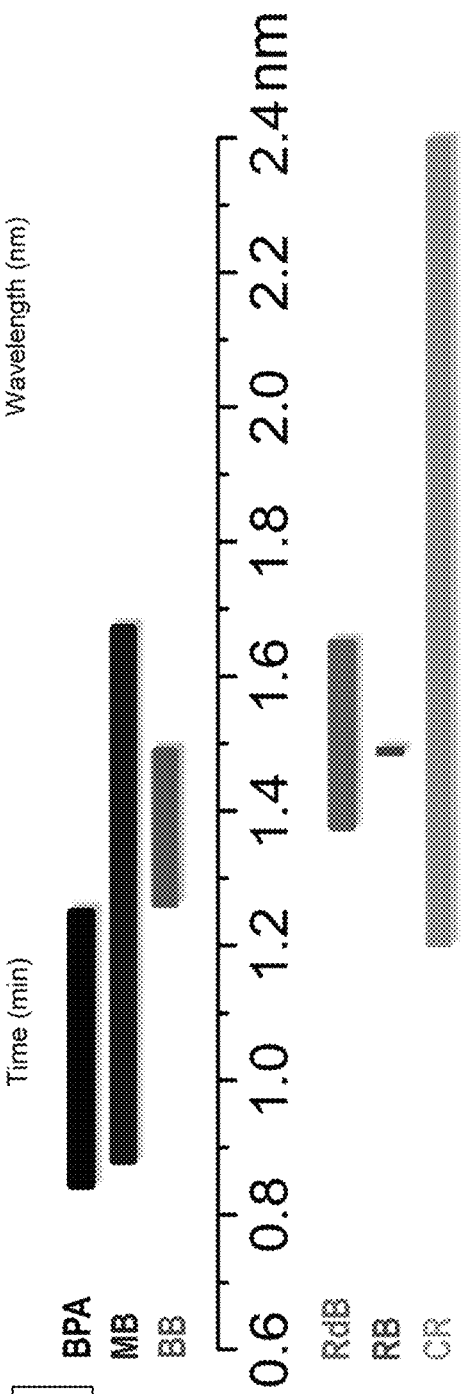
FIG. 15A
FIG. 15B
FIG. 15C

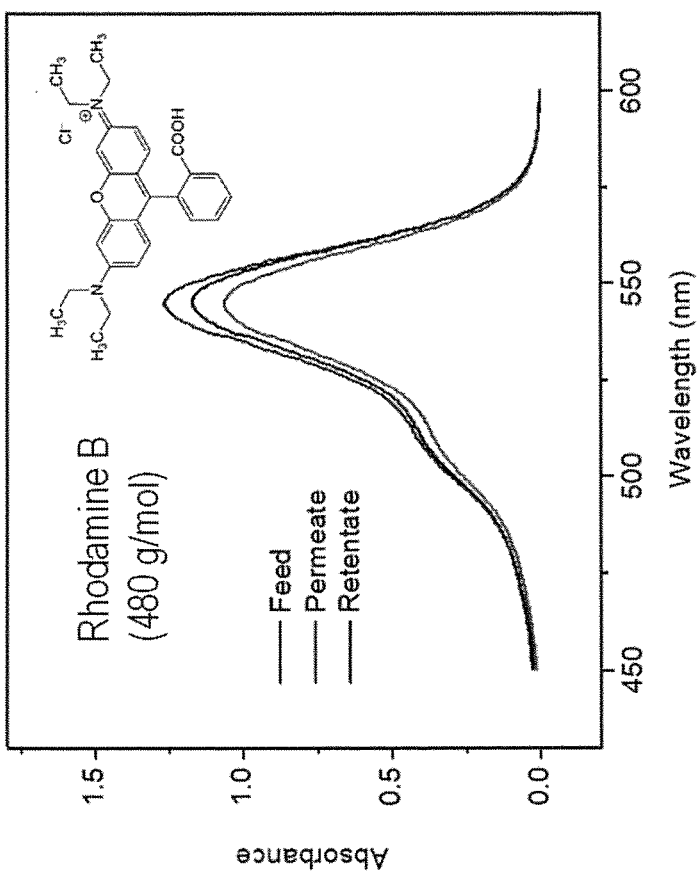
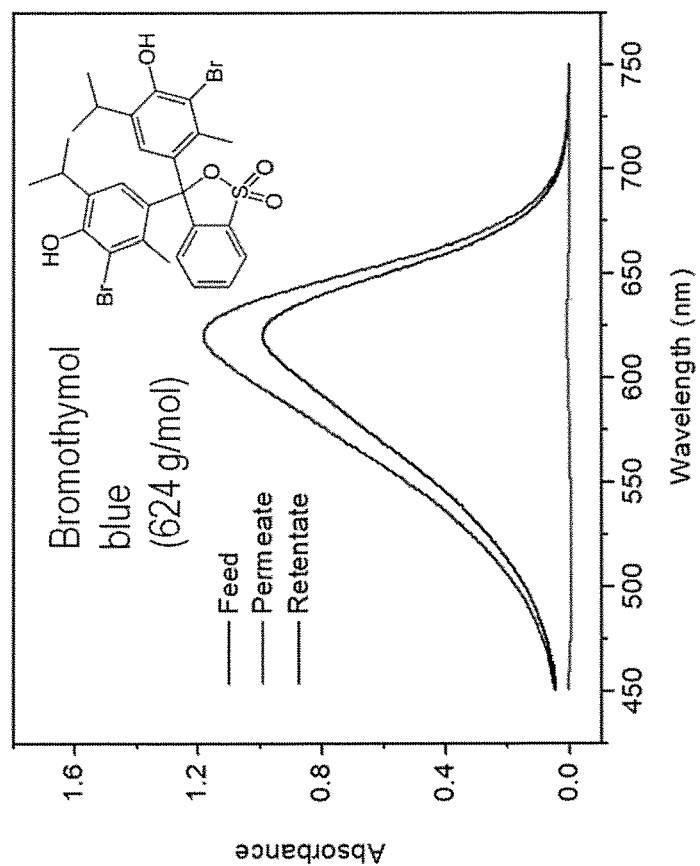
FIGURE 18

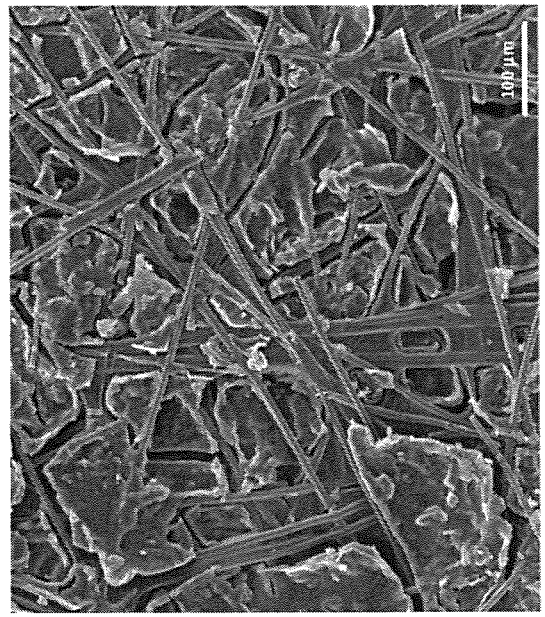
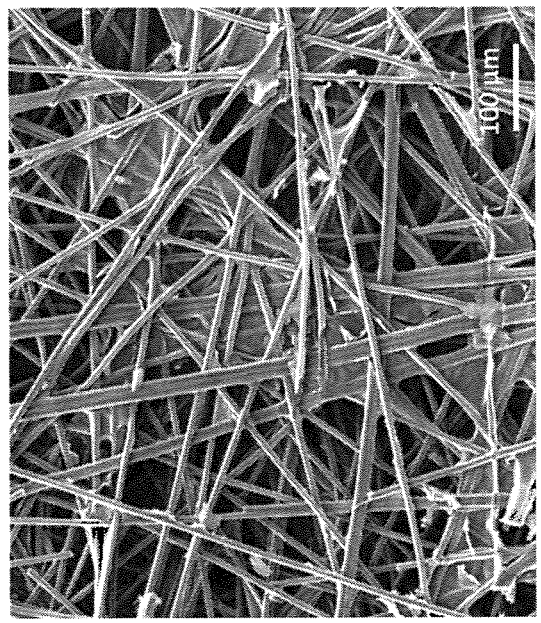
Loading 4 times with PPN 1
FIGURE 23

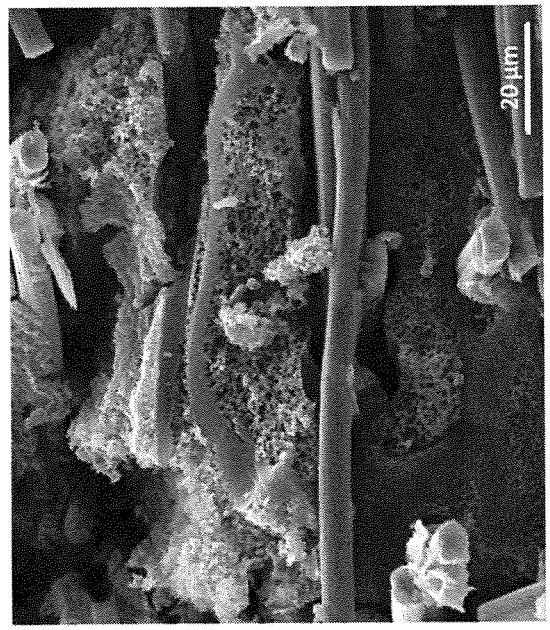
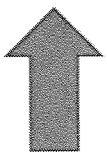
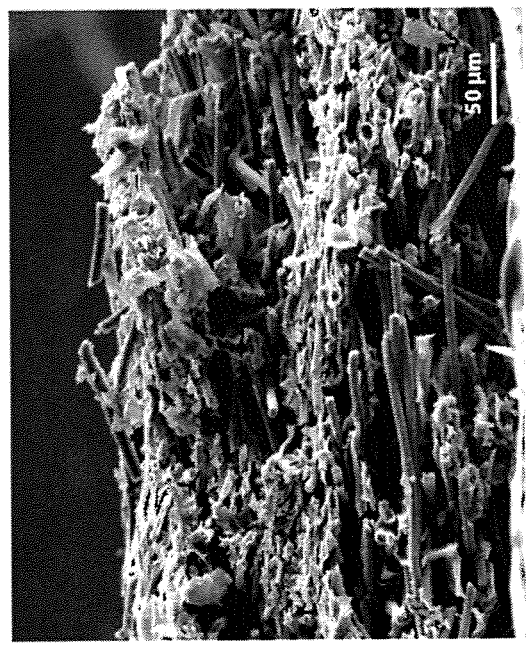
FIGURE 24

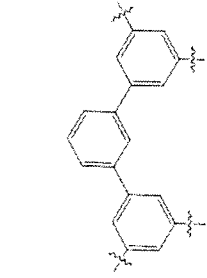 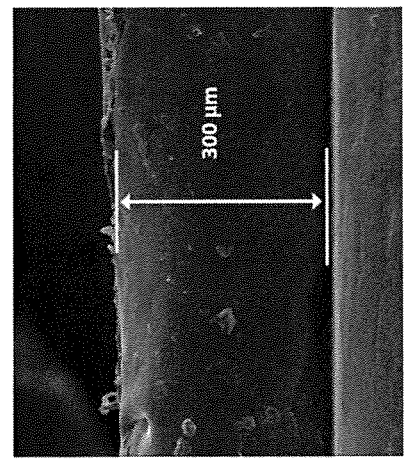 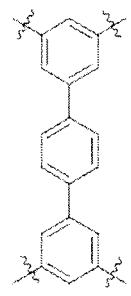 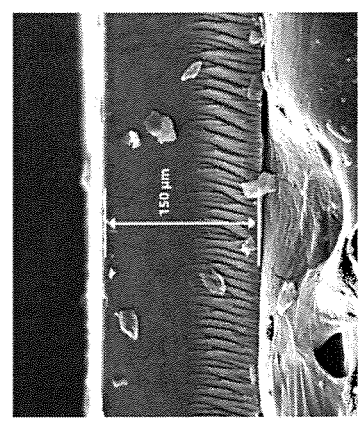 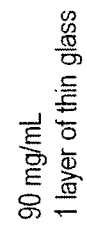 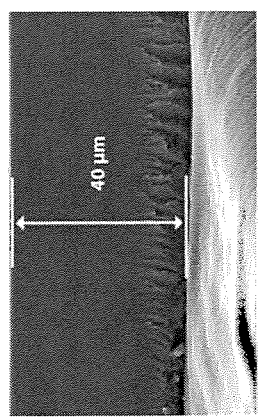
FIGURE 26

METHANESULFONIC ACID MEDIATED SOLVENT FREE SYNTHESIS OF CONJUGATED POROUS POLYMER NETWORKS

CROSS-REFERENCE TO RELATED APPLICATIONS

The present application claims the benefit of U.S. Provisional Patent Application No. 62/444,479, filed on Jan. 10, 2017, which is incorporated herein by reference.

FIELD OF THE INVENTION

The present disclosure relates to synthesis of porous polymer networks and applications of such materials.

BACKGROUND OF THE INVENTION

The large-scale production and applications of porous polymer networks (PPNs) confronts two major challenges: On one hand, the commonly used reactions for PPNs synthesis are sensitive to atmosphere and often require expensive metal catalysts/reagents, adding undesired risk and cost to the potential mass production. On the other hand, the cross-linked nature of PPNs has prohibited feasible processing of these insoluble materials into forms relevant to many practical applications. For example, the processing of PPN into membrane and thin films are essential for their applications in gas/solution ultrafiltration [1, 2] or highly sensitive electrical sensors [3-5]. Therefore, there is an urgent demand on cost effective synthetic method for PPN that allows for sealable production of the materials and feasible solution processing.

SUMMARY OF THE INVENTION

The present disclosure relates to synthesis of porous polymer networks and applications of such materials.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

In one embodiment, the invention relates to a method for the preparation of porous polymer network comprising: (a) providing: (i) a plurality of compounds comprising at least one acetyl group, said plurality of compounds comprising at least one compound type, and (ii) an alkylsulfonic acid, and (b) treating said compounds under such conditions that reaction occurs to produce a porous polymer network. In one embodiment, said alkylsulfonic acid is methanesulfonic acid. In one embodiment, said alkylsulfonic acid is selected from the group consisting of methanesulfonic acid 3-hydroxypropane-1-sulfonic acid, ethanesulfonic acid, dodecane-1-sulfonic acid, trifluoromethane sulfonic acid. In one embodiment, said method is lacking a toxic acid. In one embodiment, the reaction does not involve a toxic acid or an acid that decomposes at high temperatures. In one embodiment, the method does not employ a toxic acid or an acid that decomposes at high temperature. In one embodiment, said method is lacking an acid that decomposes at high temperatures. In one embodiment, said reaction occurs in open air conditions. In one embodiment, wherein said method further provides additional elements which become embedded (surrounded, encapsulated, implanted, set, fixed, lodged, rooted, etc.) within the porous polymer network after the reaction. In one embodiment, said additional elements comprise nanotubes. In one embodiment, additional elements are selected from the group consisting of: carbon nanotubes, metal nanowires, dendritic metal micro/nanoparticles, carbon nanofibers, redox active metaloxide nanoparticles (such as $MnO_2$), graphene, graphene oxide, and reduced graphene oxide. In one embodiment, said method includes, but is not limed to, more than one compound types comprising at least one acetyl group. In one embodiment, said method includes only one compound type comprising, at least one acetyl group. In one embodiment, said porous polymer network comprises a conjugated porous polymer network. In one embodiment, said reaction comprises an aldol triple condensation. In one embodiment, said compound type is acetophenone. In one embodiment, said compound type is selected from the group consisting of:

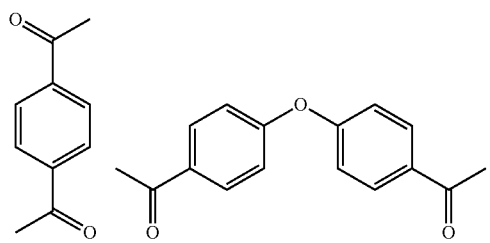

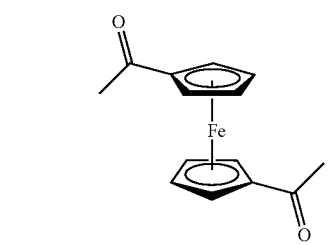

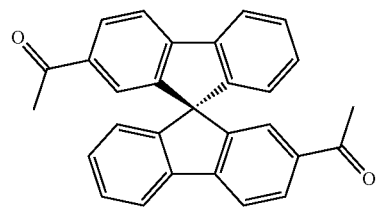

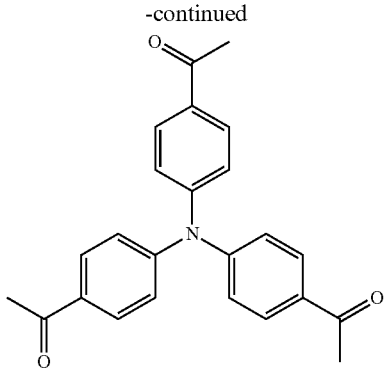
In one embodiment, said compound type is selected from the group consisting of:
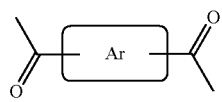
(wherein Ar = any aromatic unit)
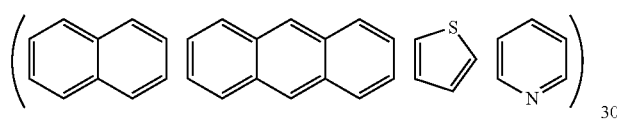
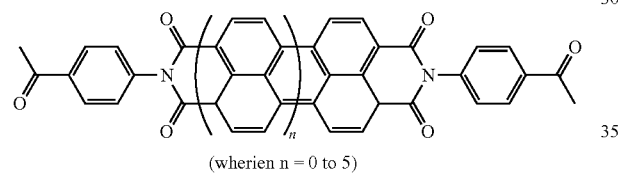
(wherien n = 0 to 5)
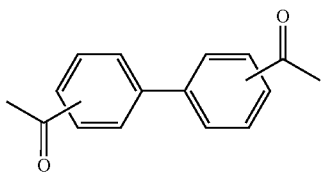
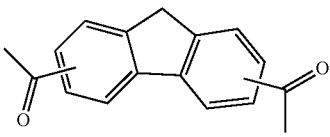
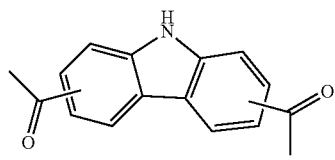
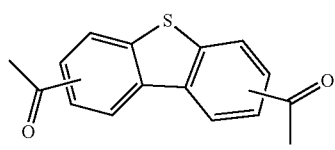
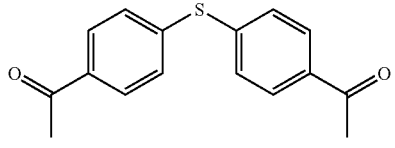
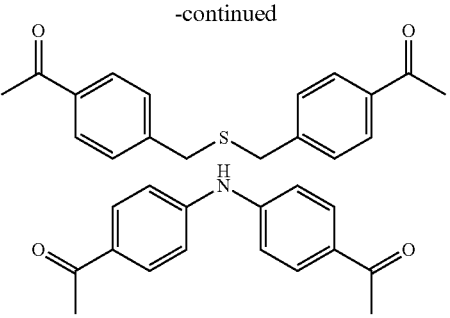
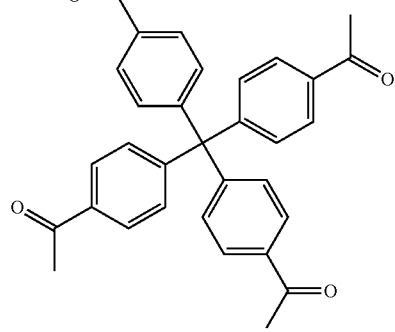
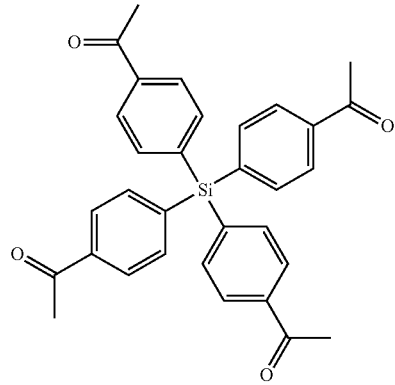
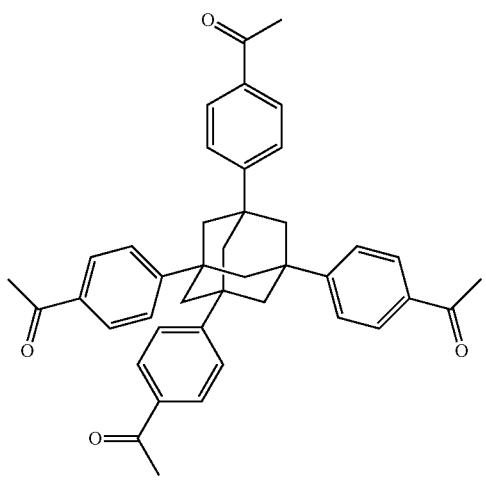

-continued
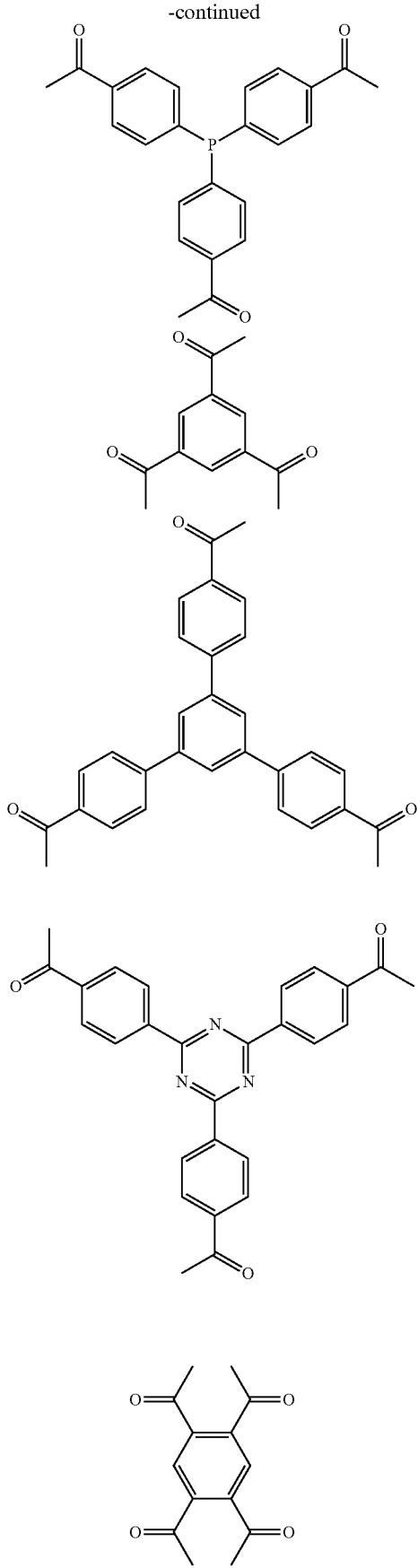
-continued
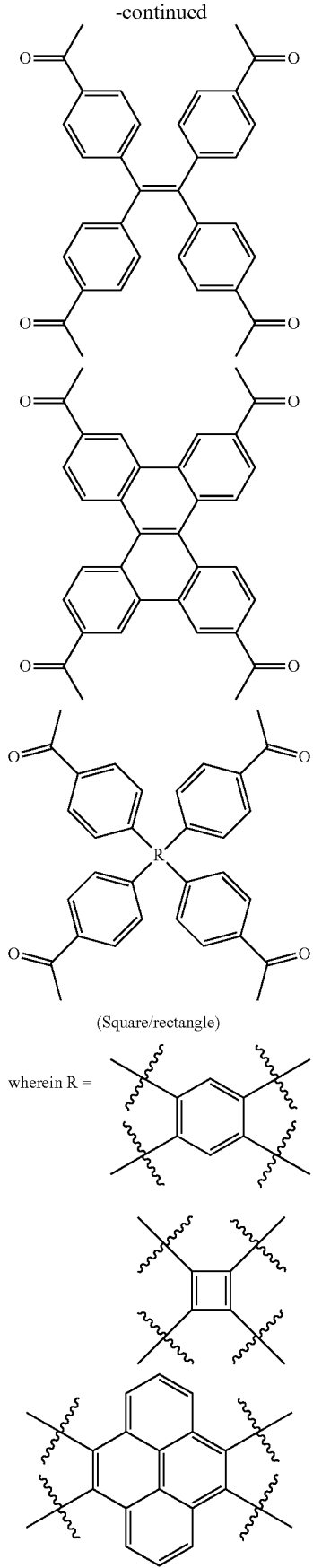
(Square/rectangle)

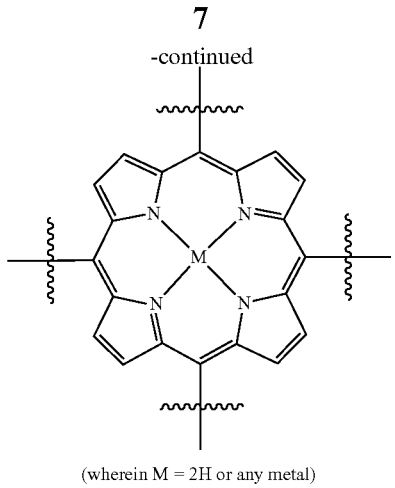

(wherein M = 2H or any metal)

In one embodiment, said porous polymer network produced has a specific surface area of greater than 1000 m²/g with a pore volume of 0.40 cm³/g. In one embodiment, said compound comprising at least one acetyl group and said acid are in a homogenous solution. In one embodiment, said conditions comprise beating. In one embodiment, said compounds and acid are reacted in a temperature range between 40-110° C. In one embodiment, said heating comprises heating to a first temperature to produce a homogenous solution, followed by heating to a second temperature to drive said reaction. In one embodiment, said method further comprises step (c) wherein said acid is neutralized by aqueous base. In one embodiment, said method further comprises step (d) wherein said porous polymer network is extracted with an organic solvent. In one embodiment, said method further comprises step (e) wherein said porous polymer network is purified by flash column chromatography.

In one embodiment, the invention relates to method of fabricating of a porous polymer network comprising: (a) providing: (i) a first reactant comprising a plurality of compounds comprising at least one acetyl group, said plurality of compounds comprising at least one compound type, and (ii) a second reactant comprising an alkylsulfonic acid, and (b) creating a solution of said reactants, (c) casting said solution in a form, and (d) treating said solution under such conditions so as to produce a porous polymer network. In one embodiment, the casting of step (c) comprises: i) deposition of portion of said solution upon said first glass substrate, and ii) application of said second glass substrate upon said first glass substrate such that the solution is between said substrates. In one embodiment, the treating of step (d) comprises: i) heating said substrates under such conditions to produce a porous polymer network film. In one embodiment, said alkylsulfonic acid is selected from the group consisting of methanesulfonic acid 3-hydroxypropane1-sulfonic acid, ethanesulfonic acid, dodecane-1-sulfonic acid, trifluoromethane sulfonic acid. In one embodiment, said alkylsulfonic acid is methanesulfonic acid. In one embodiment, said method is lacking a toxic acid. In one embodiment, said method is lacking an acid that decomposes at high temperatures. In one embodiment, the reaction does not involve a toxic acid or an acid that decomposes at high temperatures. In one embodiment, the method does not employ a toxic acid or an acid that decomposes at high temperatures. In one embodiment, said method further provides additional elements within said form which become embedded (surrounded, encapsulated, implanted, set, fixed, lodged, rooted, etc.) within the porous polymer network after the reaction. In one embodiment, said additional elements comprise carbon nanotubes, carbon nanofibers, CdS, CdSe, MoS₂, silver or gold nanowires (these composites allows for higher mechanical strength, optical activity or electrical conductivity, leading to applications in ultrafiltration membranes, optical sensors, or electrochemical supercapacitors). In one embodiment, additional elements are selected from the group consisting of: carbon nanotubes, metal nanowires, dendritic metal micro/nano-particles, carbon nanofibers, redox active metaloxide nanoparticles (such as MnO₂), graphene, graphene oxide, and reduced graphene oxide. In one embodiment, said method includes more than one compound types comprising at least one acetyl group. In one embodiment, said method includes only one compound type comprising at least one acetyl group. In one embodiment, said porous polymer network comprises a conjugated porous polymer network. In one embodiment, said reaction comprises an aldol triple condensation. In one embodiment, said compound type is acetophenone. In one embodiment, said compound type is selected from the group consisting of:

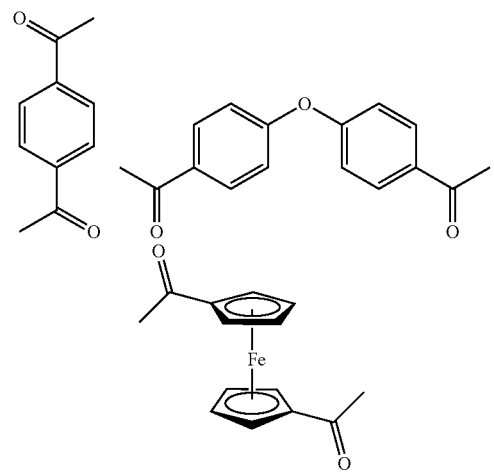

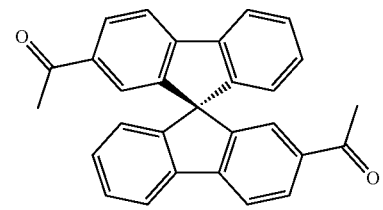

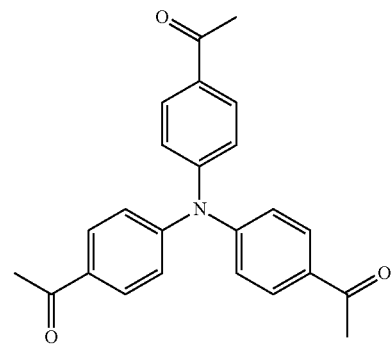

In one embodiment, said compound type is selected from the group consisting of:
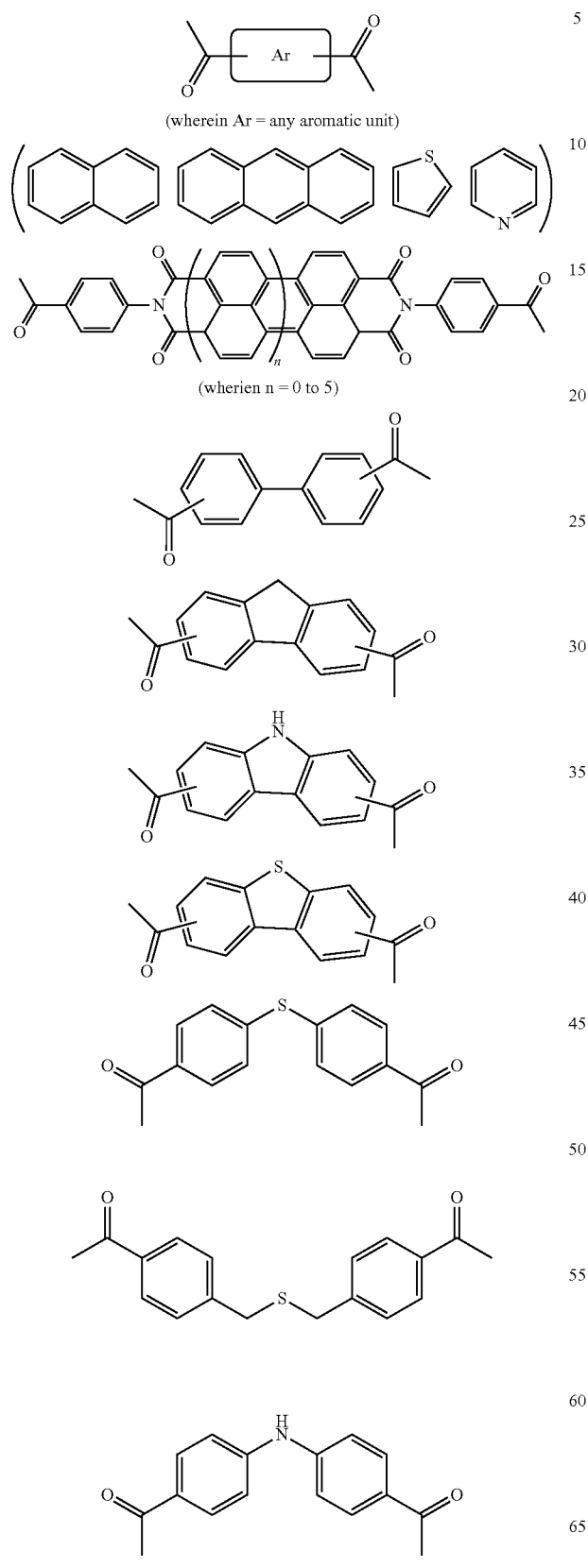
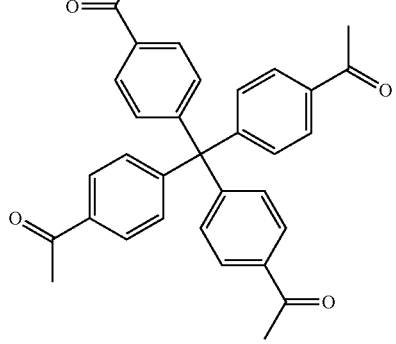
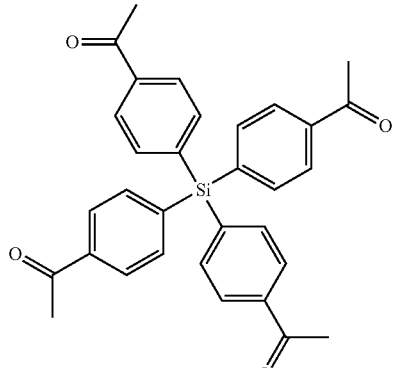
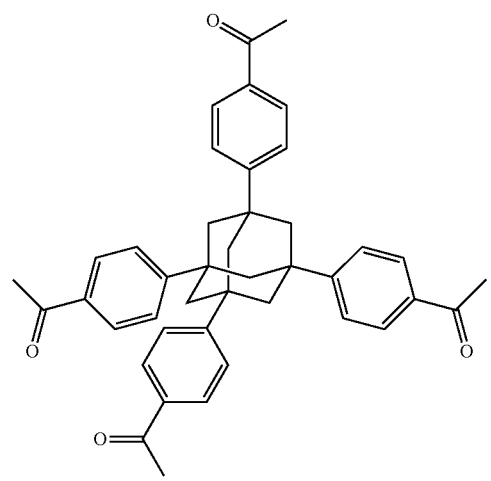
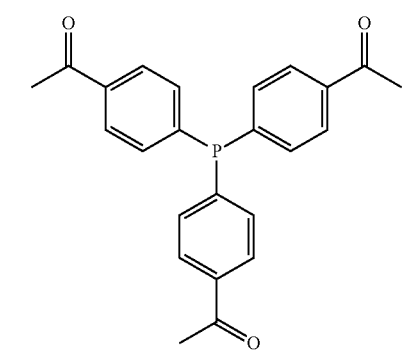

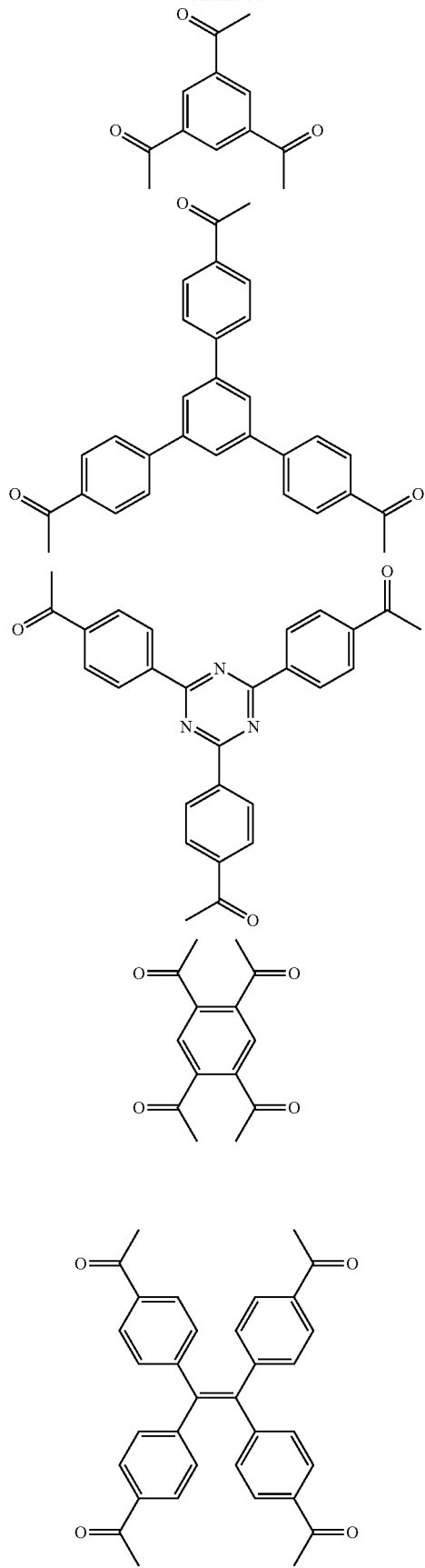
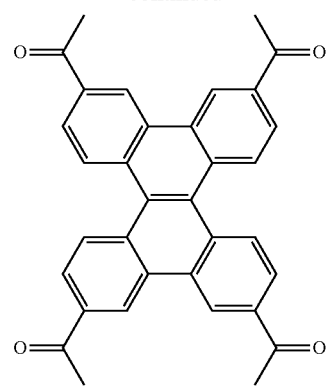
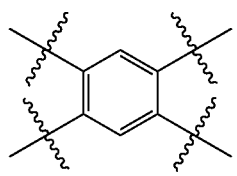
(Square/rectangle)
wherein R =
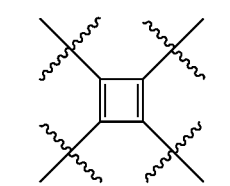
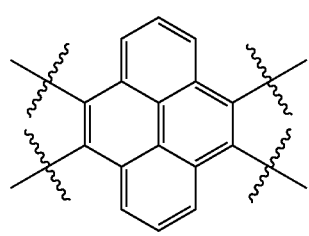

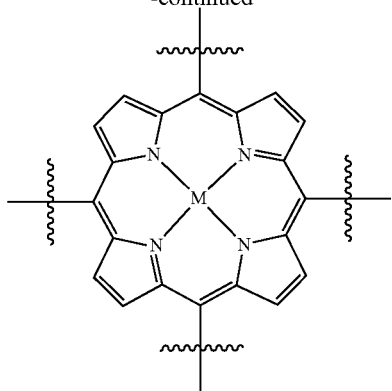

(wherein M = 2H or any metal)

In one embodiment, said porous polymer network produced has a specific surface area of greater than 1000 m²/g, with a pore volume of 0.40 cm³/g. In one embodiment, creating a solution at step b) comprises creating a homogenous solution of at least one compound type comprising at least one acetyl group and methanesulfonic acid. In one embodiment, said conditions of step d) comprise heating. In one embodiment, said compounds and acid are reacted in a temperature range between 40-110° C. In one embodiment, said heating comprises heating to a first temperature to produce a homogenous solution, followed by heating to a second temperature to drive said reaction. In one embodiment, said method further comprises step (e) wherein said acid is neutralized by aqueous base. In one embodiment, said reaction occurs in open air conditions. In one embodiment, said porous polymer network produced has a basic structure selected from the group consisting of

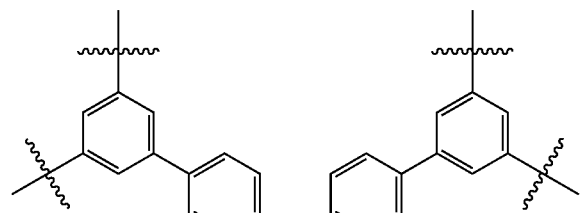

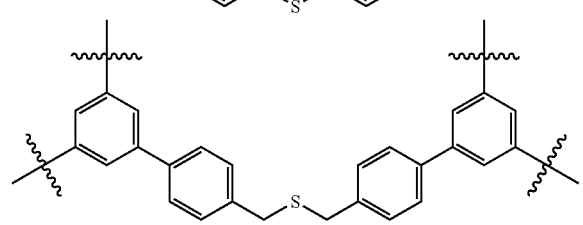

In one embodiment, said porous polymer network comprises a metal absorbing porous polymer network.

In one embodiment, the invention relates to a mixture comprising a solution of an alkylsulfonic acid and at least one compound type comprising one or more acetyl groups. In one embodiment, said solution is in a cast or mold. In one embodiment, said alkylsulfonic acid is selected from the group consisting of methanesulfonic acid 3-hydroxypropane-1-sulfonic acid, ethanesulfonic acid, dodecane-1-sulfonic acid, trifluoromethane sulfonic acid. In one embodiment, said alkylsulfonic acid is methanesulfonic acid. In one embodiment, said compound type is acetophenone. In one embodiment, said compound type is selected from the group consisting of:

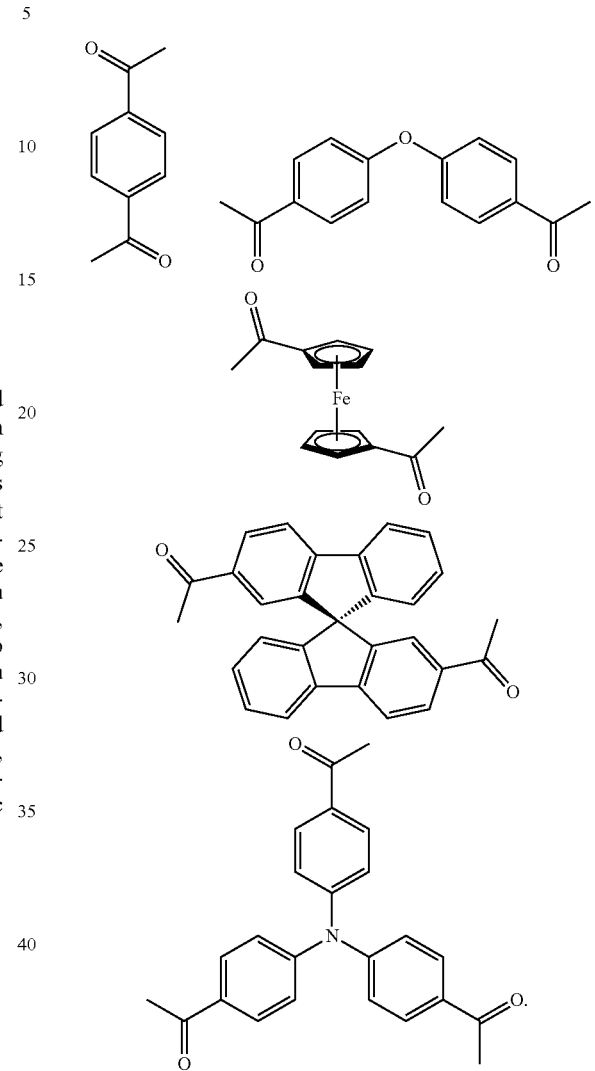

In one embodiment, said compound type is selected from the group consisting of:

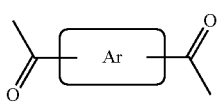

(wherein Ar = any aromatic unit)

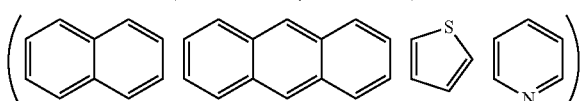

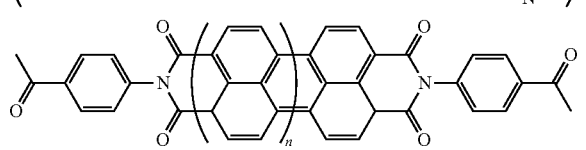

(wherien n = 0 to 5)

-continued
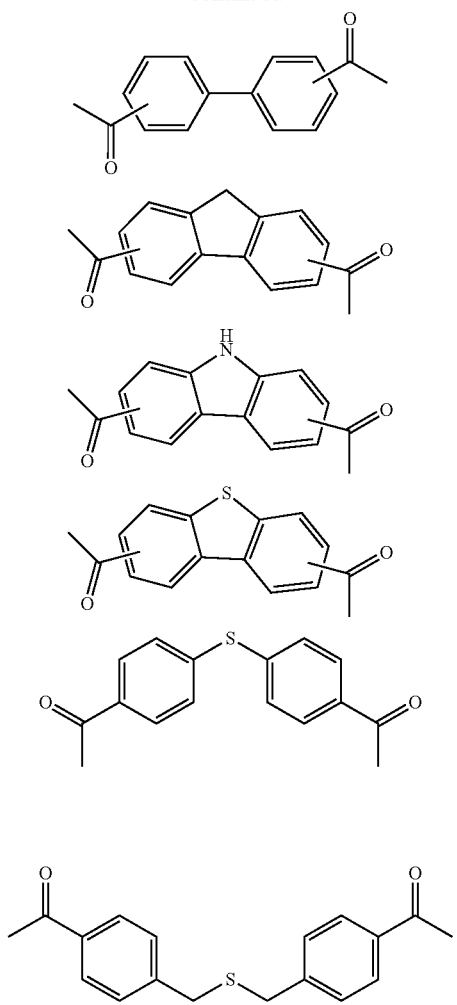
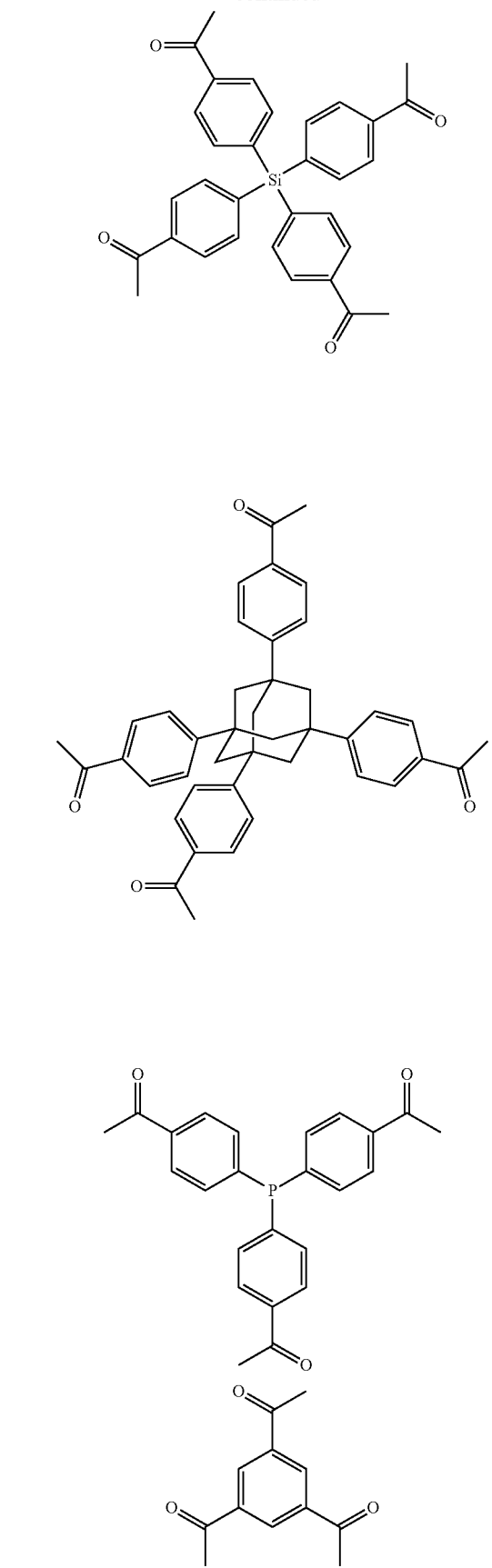

-continued
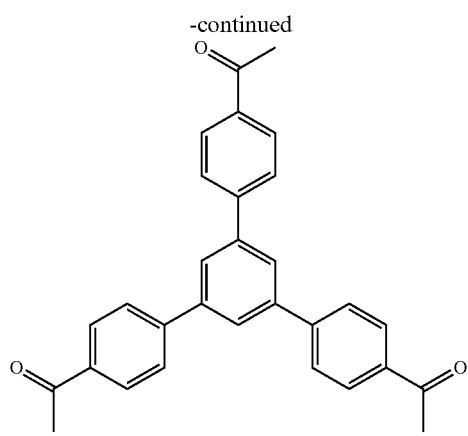
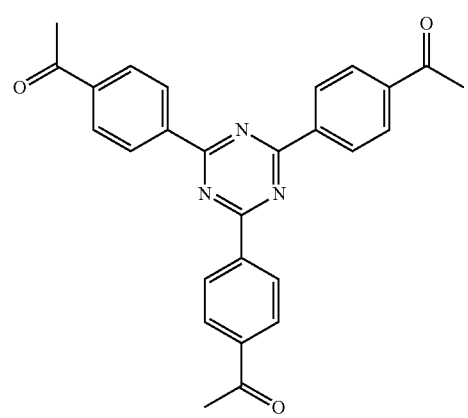
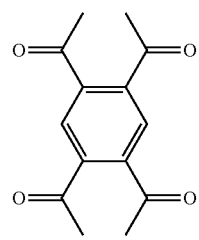
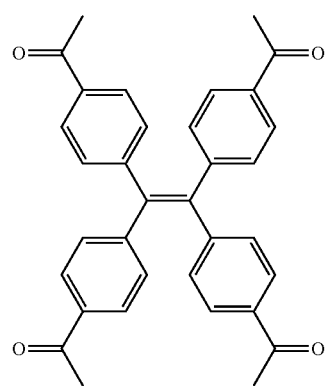
-continued
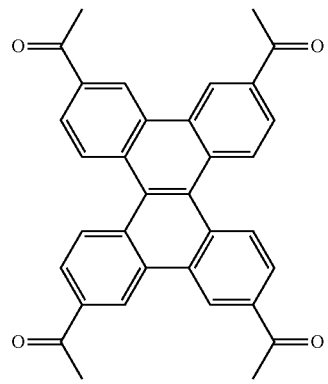
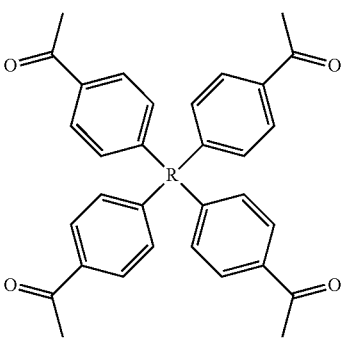
(Square/rectangle)
wherein R =
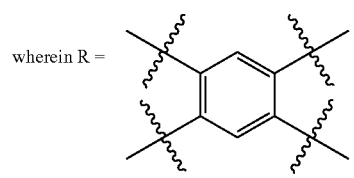
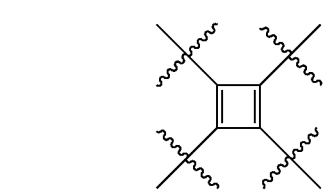
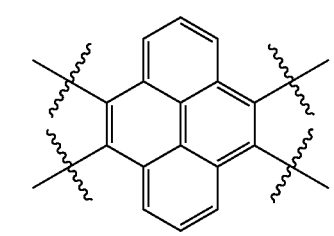

-continued

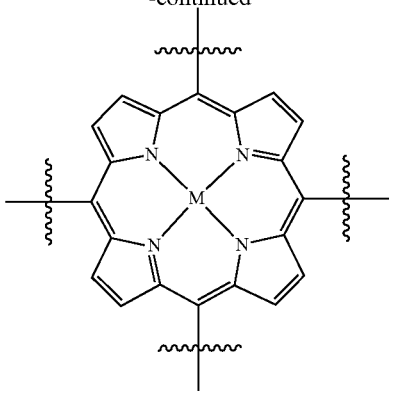

(wherein M = 2H or any metal)

In one embodiment, said porous polymer network produced has a basic structure selected from the group consisting of

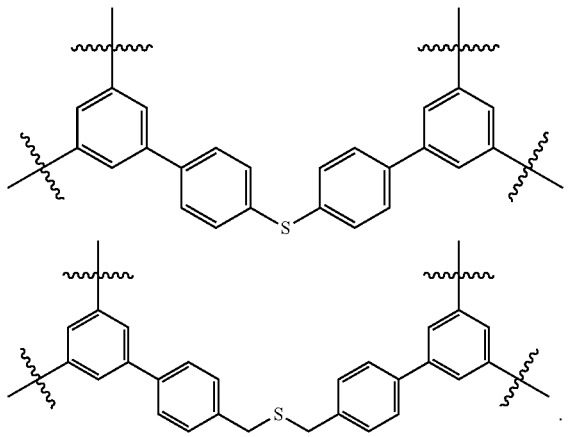

In one embodiment, said porous polymer network comprises a metal absorbing porous polymer network.

In one embodiment, the invention relates to a porous polymer network which has a basic structure selected from the group consisting of

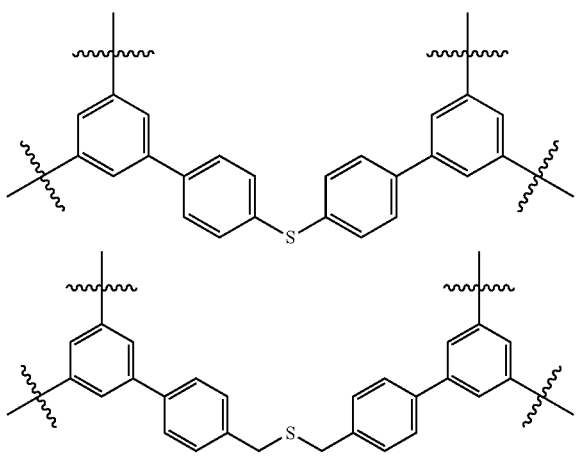

In one embodiment, said porous polymer network comprises a metal absorbing porous polymer network.

In one embodiment, the invention relates to a method for nanofiltration using a porous polymer network. In one embodiment, said porous polymer network comprises a membrane. In one embodiment, said porous polymer network comprises a filter. In one embodiment, said nanofiltration comprises heavy metal water filtration. In one embodiment, said heavy metal water filtration comprises water purification for pharmaceutical applications. In one embodiment, said heavy metal water filtration comprises soil remediation. In one embodiment, said heavy metal water filtration comprises ground water remediation. In one embodiment, said nanofiltration comprises size exclusion filtration. In one embodiment, said size exclusion filtration comprises chemical mixture separation. In one embodiment, said chemical mixture separation comprises filtration of heavy metals. In one embodiment, said chemical mixture separation comprises dye exclusion. In one embodiment, said chemical mixture separation comprises non-sensitive permeability to nonpolar, polar protic, and polar aprotic solvents, wherein the permeance of solvents depends only on the solvent viscosity. In one embodiment, said porous polymer network which has a basic structure selected from the group consisting of

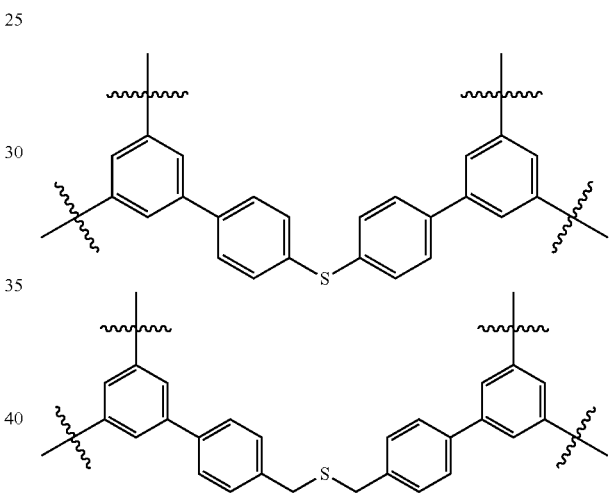

In one embodiment, said porous polymer network comprises a metal absorbing porous polymer network. In one embodiment, said porous polymer network comprising is prepared by a method: (a) providing: (i) a plurality of compounds comprising at least one acetyl group, said plurality of compounds comprising at least one compound type, and (ii) an alkylsulfonic acid, and (b) treating said compounds under such conditions that reaction occurs to produce a porous polymer network. In one embodiment, said alkylsulfonic acid is methanesulfonic acid. In one embodiment, said alkylsulfonic acid is selected from the group consisting of methanesulfonic acid 3-hydroxypropane-1-sulfonic acid, ethanesulfonic acid, dodecane-1-sulfonic acid, trifluoromethane sulfonic acid. In one embodiment, said method is lacking a toxic acid. In one embodiment, the reaction does not involve a toxic acid or an acid that decomposes at high temperatures. In one embodiment, the method does not employ a toxic acid or an acid that decomposes at high temperature. In one embodiment, said method is lacking an acid that decomposes at high temperatures. In one embodiment, said reaction occurs in open air conditions. In one embodiment, wherein said method further provides additional elements which become embedded (surrounded, encapsulated, implanted, set, fixed, lodged, rooted, etc.) within the porous polymer network after the reaction. In one embodiment, said additional elements comprise nanotubes. In one embodiment, additional elements are selected from the group consisting of: carbon nanotubes, metal nanowires, dendritic metal micro/nano-particles, carbon nanofibers, redox active metaloxide nanoparticles (such as $MnO_2$), graphene, graphene oxide, and reduced graphene oxide. In one embodiment, said method includes, but is not limed to, more than one compound types comprising at least one acetyl group. In one embodiment, said method includes only one compound type comprising at least one acetyl group. In one embodiment, said porous polymer network comprises a conjugated porous polymer network. In one embodiment, said reaction comprises an aldol triple condensation. In one embodiment, said compound type is acetophenone. In one embodiment, said compound type is selected from the group consisting of:

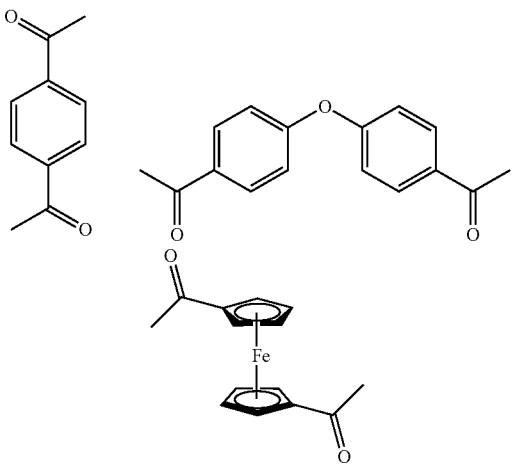

In one embodiment, said compound type is selected from the group consisting of:

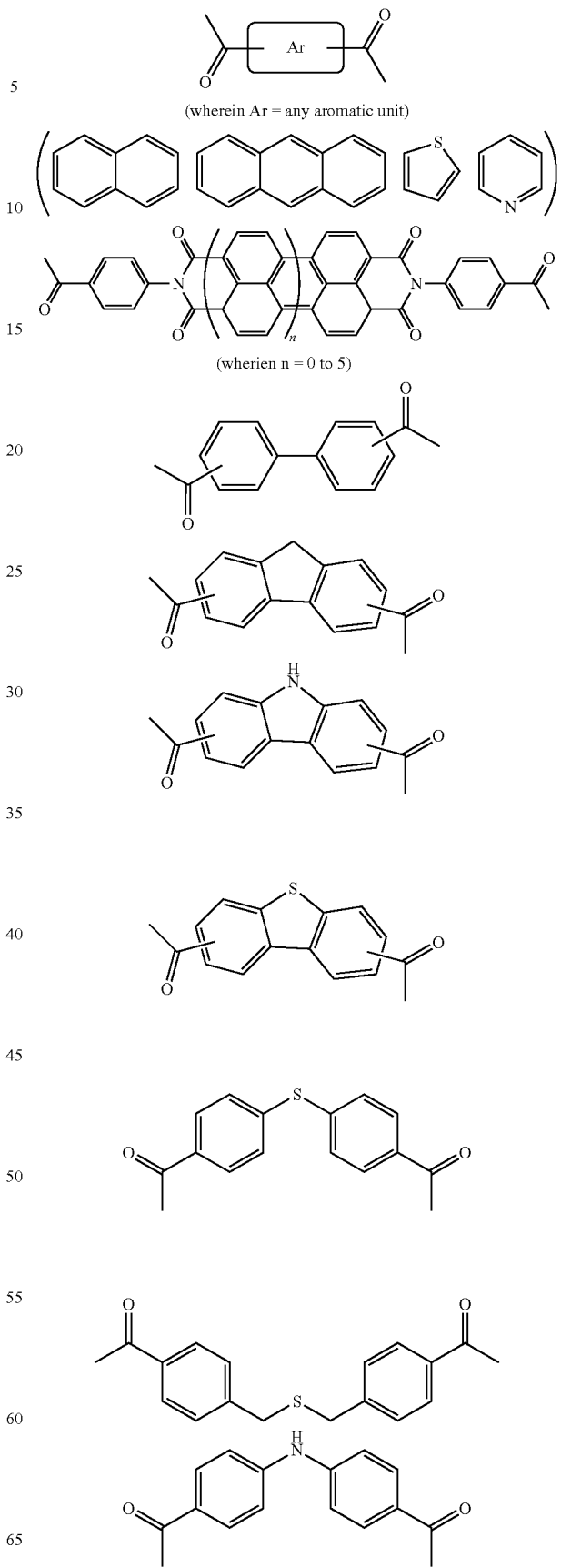

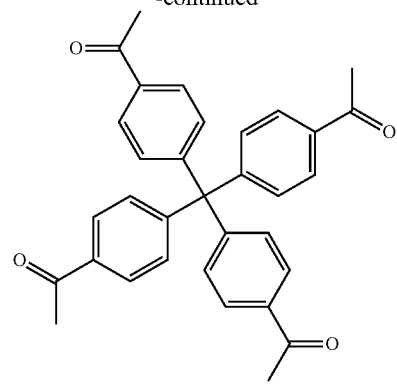
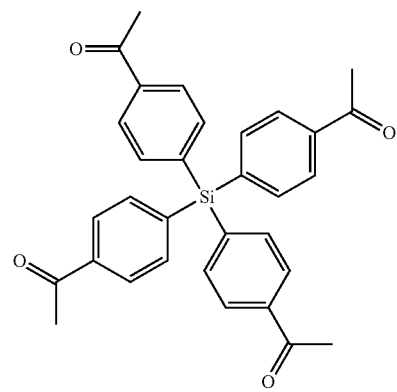
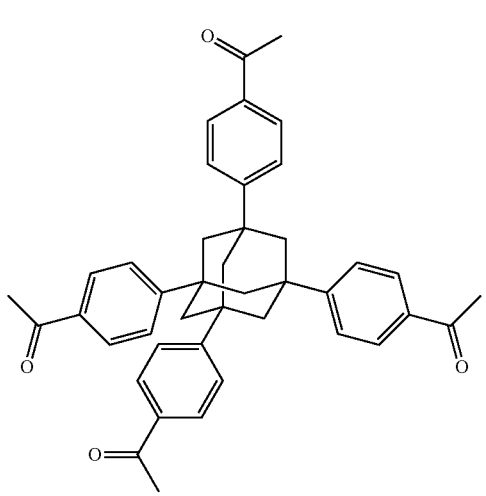
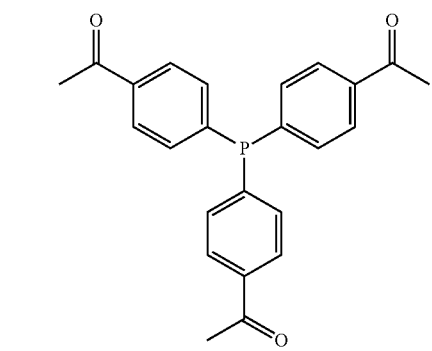
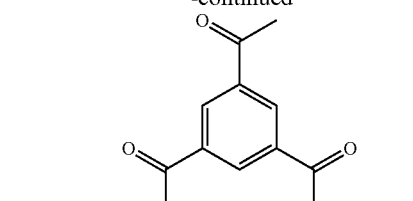
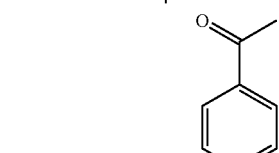
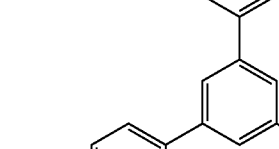
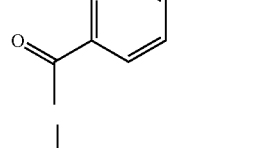
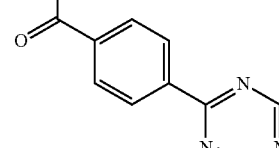
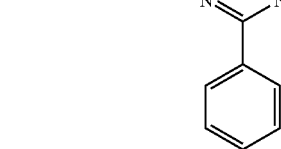
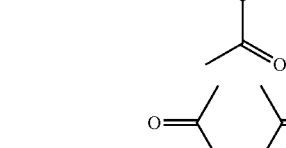
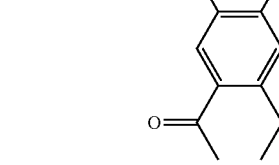
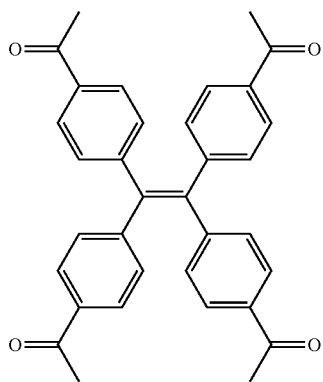

-continued

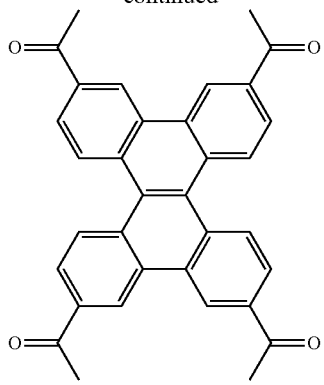

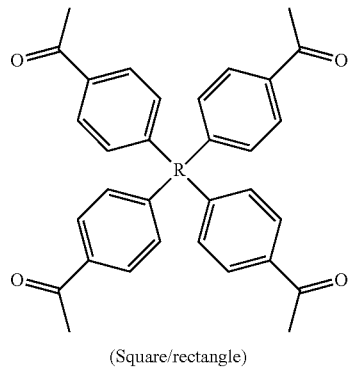

(Square/rectangle)

wherein R =

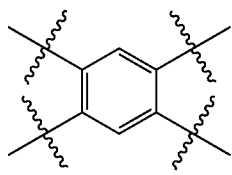

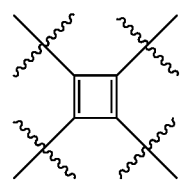

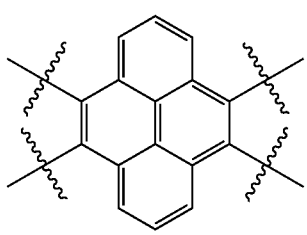

-continued

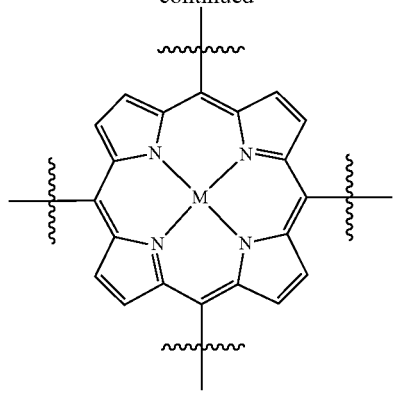

(wherein M = 2H or any metal)

In one embodiment, said porous polymer network produced has a specific surface area of greater than 1000 m$^2$/g with a pore volume of 0.40 cm$^3$/g.

DEFINITIONS

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, the term "solvent" as used herein describes a liquid that serves as the medium for a reaction or a medium for the distribution of components of different phases or extraction of components into said solvent.

As used herein, the term "polar solvent" as used herein describes solvents that have large dipole moments (aka "partial charges"); they often contain bonds between atoms with very different electronegativities, such as oxygen and hydrogen. Non-limiting examples of polar solvents include polar aprotic solvents and polar protic solvents. Non-limiting examples of polar protic solvents include but are not limited to: formic acid, n-butanol, isopropanol, n-propanol, ethanol, methanol, acetic acid, and water. Non-limiting examples of polar aprotic solvents include but are not limited to: tetrahydrofuran, ethyl acetate, acetone, dimethylformamide, acetonitrile, dimethyl sulfoxide, nitromethane, and propylene carbonate.

As used herein, the term "miscibility" as used herein describes the property of substances to mix in all proportions, forming a homogeneous solution. The term is most often applied to liquids, but applies also to solids and gases. Water and ethanol, for example, are miscible because they mix in all proportions.

As used herein, the term "water miscible solvent" as used herein describes solvents that are able to form a homogeneous solution with water. Examples of water miscible solvents include, but are not limited to: acetic acid, acetone, acetonitrile, dimethylformamide, dimethyl sulfoxide, dioxane, ethanol, methanol, n-propanol, isopropanol, and tetrahydrofuran.

As used herein, the term "non-polar solvent" as used herein describes solvents contain bonds between atoms with similar electronegativities, such as carbon and hydrogen (for example hydrocarbons, such as gasoline). Nonlimiting examples of non-polar solvents include, but are not limited to: pentane, cyclopentane, hexane, cyclohexane, benzene, toluene, 1,4-dioxane, chloroform, diethyl ether, and dichloromethane.

As used herein, the term "water immiscible solvents" as used herein describes solvents that are not able to form a homogeneous solution with water. Examples of water immiscible solvents include, but are not limited to: benzene, n-butanol, butyl acetate, carbon tetrachloride, chloroform, cyclohexane, 1,2-dichloroethane, ethyl acetate, di-ethyl ether, heptanes, hexane, methyl-t-butyl ether, methyl ethyl ketone, pentane, petroleum ethers, di-isopopyl ether, trichloroethylene and xylene.

As used herein, the term "acetyl group" is used throughout the specification to describe a functional group, the acyl with chemical formula ($CH_3CO-$) and the structure:

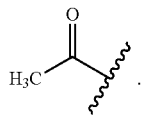

The acetyl group contains a methyl group single-bonded to a carbonyl. The carbonyl center of an acyl radical has one nonbonded electron with which it forms a chemical bond to the remainder R of the molecule,

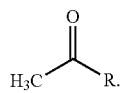

As used herein, the term "aldol condensation" is used throughout the specification to describe a condensation reaction in organic chemistry in which an enol or an enolate ion reacts with a carbonyl compound to form a β-hydroxyaldehyde or β-hydroxyketone, followed by dehydration to give a conjugated enone.

As used herein, the term "methanesulfonic acid" or "MSA" is used throughout the specification to describe a colorless liquid with the chemical formula $CH_3SO_3H$ and the structure

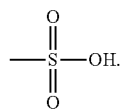

As used herein, the term "conjugated porous polymer network" is used throughout the specification to describe a As used herein, the term "conjugated microporous polymer" is used throughout the specification to describe a sub-class of porous materials that are related to structures such as zeolites, metal-organic frameworks, and covalent organic frameworks, but are amorphous in nature, rather than crystalline. CMPs are also a sub-class of conjugated polymers and possess many of the same properties such as conductivity, mechanical rigidity, and insolubility. CMPs are created through the linking of building blocks in a π-conjugated fashion and possess 3-D networks [6].

As used herein, the term "acetophenone" is used throughout the specification to describe the organic compound with the formula $C_6H_5C(O)CH_3$ (also represented by the letters PhAc or BzMe), is the simplest aromatic ketene.

As used herein, the term "1,1'-(1,4-phenylene)diethanone" is used throughout the specification to describe an organic compound with the structure

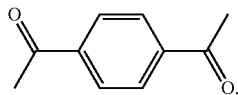

As used herein, the term "1,1'-(oxybis(4,1-phenylene))diethanone" is used throughout the specification to describe an organic compound with the structure

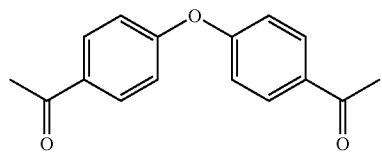

As used herein, the term "(S)-1,1'-(9,9'-spirobi[fluorene]-7,7'-diyl)diethanone" is used throughout the specification to describe an organic compound with the structure

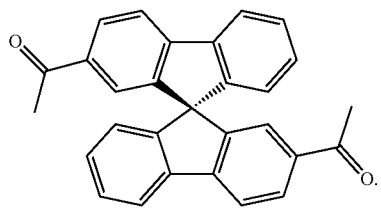

As used herein, the term "1,1',1''-(nitrilotris(benzene-4,1-diyl))triethanone" is used throughout the specification to describe an organic compound with the structure

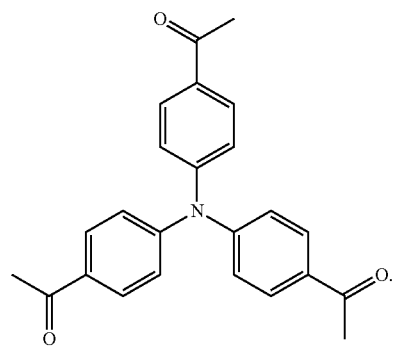 [SMILES: CC(=O)c1ccc(N(c2ccc(C(C)=O)cc2)c2ccc(C(C)=O)cc2)cc1]

As used herein, the term "specific surface area" is used throughout the specification to describe a property of solids defined as the total surface area of a material per unit of mass, (with units of $m^2/kg$ or $m^2/g$) or solid or bulk volume (units of $m^2/m^3$ or $m^{-1}$).

As used herein, the term "pore volume" is used throughout the specification to describe a the ratio of a porous material's air volume to a porous materials total volume.

As used herein, the term "porosity" or "void fraction" is used throughout the specification to describe a measure of the void (i.e. "empty") spaces in a material, and is a fraction of the volume of voids over the total volume, between 0 and 1, or as a percentage between 0 and 100%, As used herein, the term "homogenous solution" is used throughout the specification to describe a mixture of two or more components that have a uniform appearance and composition.

As used herein, the term "open air" is used throughout the specification to describe a condition under which an reaction occurs without special precautions made to provided a closed atmosphere. Under these conditions, the reaction is subject to the surrounding air pressure and humidity.

As used herein, the term "alkylsulfonic acid" is used throughout the specification to describe a member of the class of organosulfur compounds with the general formula R—S(=O)$_2$—OH, where R is an organic alkyl and the S(=O)$_2$—OH group a sulfonyl hydroxide.

As used herein, the term "toxic acid" is used throughout the specification to describe acids that are classified in Category 1-3 according to GHS Classification in accordance to 29 CFR 1910.

As used herein, the term "nanofiltration" or "NF" is used throughout a relatively recent membrane filtration process used most often with low total dissolved solids water such as surface water and fresh groundwater, with the purpose of softening (polyvalent cation removal) and removal of disinfection by-product precursors such as natural organic matter and synthetic organic matter.

DESCRIPTION OF THE FIGURES

The accompanying figures, which are incorporated into and form a part of the specification, illustrate several embodiments of the present invention and, together with the description, serve to explain the principles of the invention. The figures are only for the purpose of illustrating a preferred embodiment of the invention and are not to be construed as limiting the invention.

FIG. 1a shows a model reaction for methanesulfonic acid catalyzed aldol triple condensation.

FIG. 1b shows the possible reaction mechanism for aldol triple condensation.

FIG. 1c shows the structure of different monomers (M1-M5) for preparing porous polymer networks (PPN1-PPN5).

FIG. 4a shows a "Casting-followed-by-reaction" strategy to make an organic porous film.

FIG. 4b shows the MSA solution between two glass substrates.

FIG. 4c shows an organic porous films formed between two glass substrates.

FIG. 4d shows free-standing organic porous films in ethanol.

FIG. 4e shows a SEM image of PPN1 film PPN1 film (left, scale bar 1 mm), PPN1 film's surface (middle, scale bar 500 nm), PPN1 film's edge (right, scale bar=20 μm).

FIG. 5 shows photos of reaction process for PPN synthesis, specifically the color change during the synthesis of PPN1.

FIG. 15 a-c shows the selective dye adsorption of dyes into PPN1.

FIG. 18 shows the UV-vis absorption spectra of bromothymol blue feed solution, the permeate solution, and the retentate solution.

FIG. 23 shows the morphology of PPN1/CFP with loading 4 times with PPN1 at 100 μm resolution.

FIG. 24 shows the morphology of PPN1/CFP with loading 4 times with PPN1 at 50 μm resolution and 20 μm resolutions, respectively.

FIG. 26 shows thickness control of PPN films PPN1 and PPN6 on glass.

DETAILED DESCRIPTION OF THE INVENTION

Figure 2A:
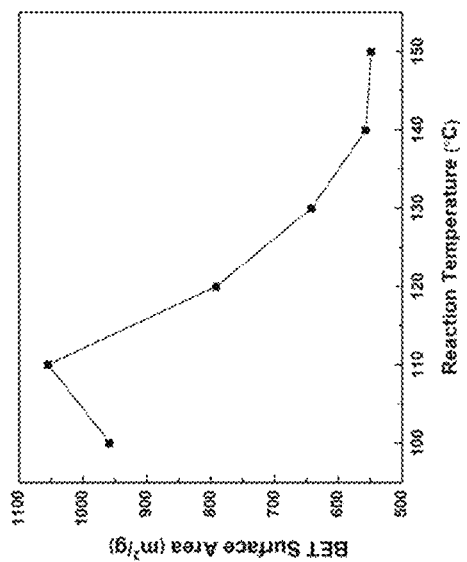
FIG. 2a shows methanesulfonic acid catalyzed ATC reaction for PPN1.

The present disclosure relates to synthesis of porous polymer networks and applications of such materials.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In one embodiment, the invention relates to a method for the preparation of conjugated porous polymer network under ambient condition comprising: (a) providing: (i) at least one compound comprising at least one acetyl group, and (ii) methanesulfonic acid, and (b) treating said compounds under such conditions that an aldol triple condensation occurs to produce a conjugated porous polymer network. In one embodiment, said compound comprising at least one acetyl group is acetophenone. In one embodiment, said compound comprising at least one acetyl group is selected from the group consisting of:

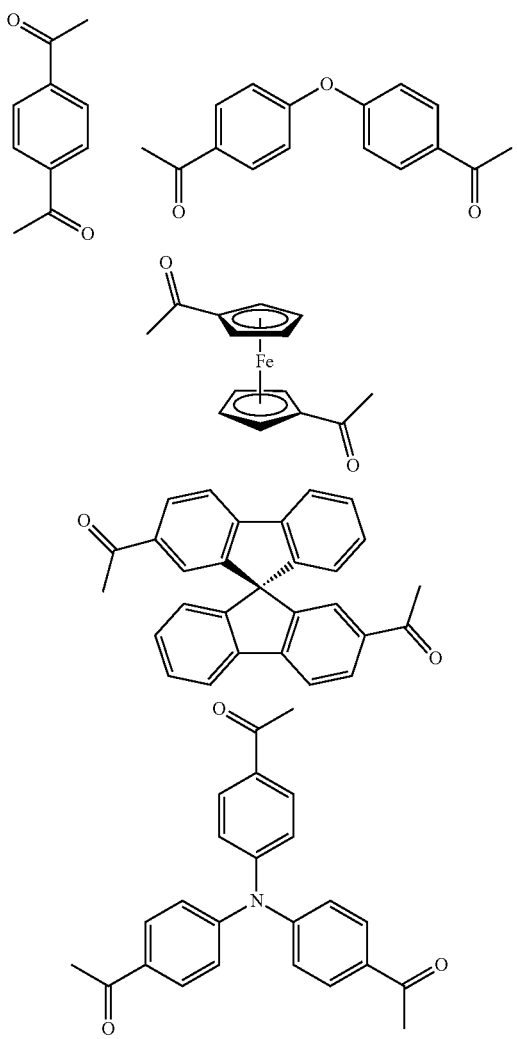

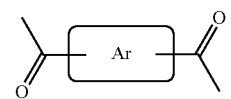

(wherein Ar = any aromatic unit)

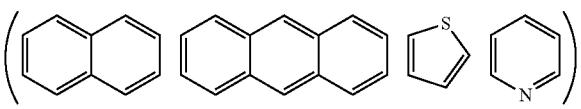

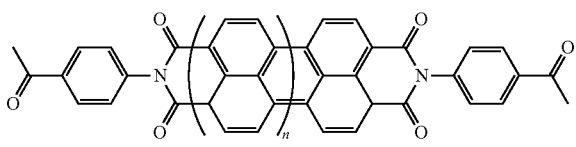

(wherien n = 0 to 5)

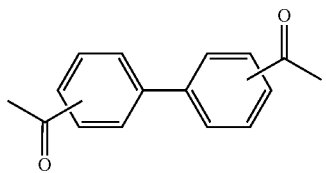

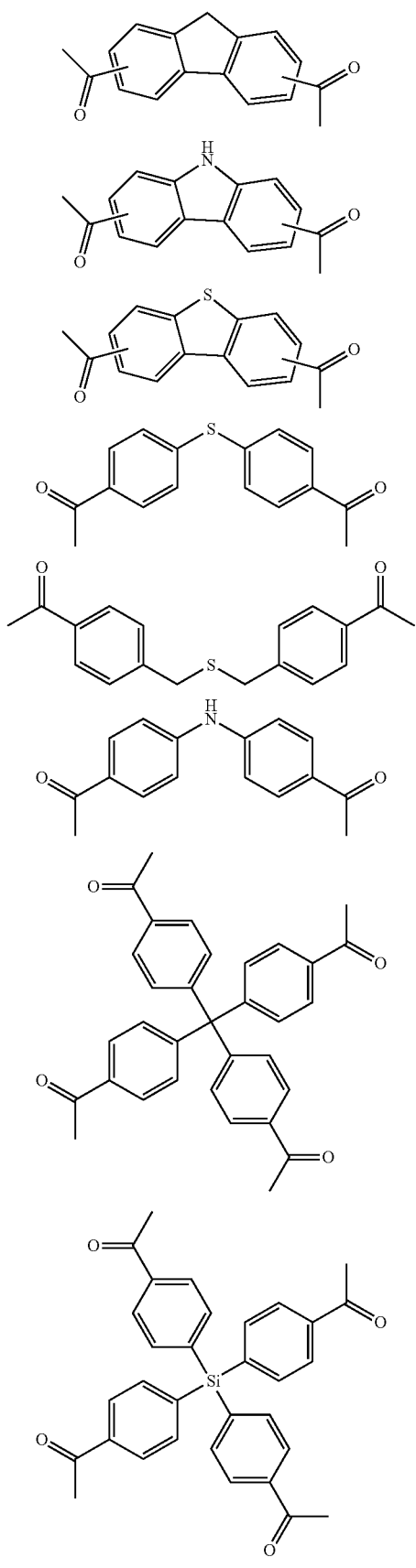
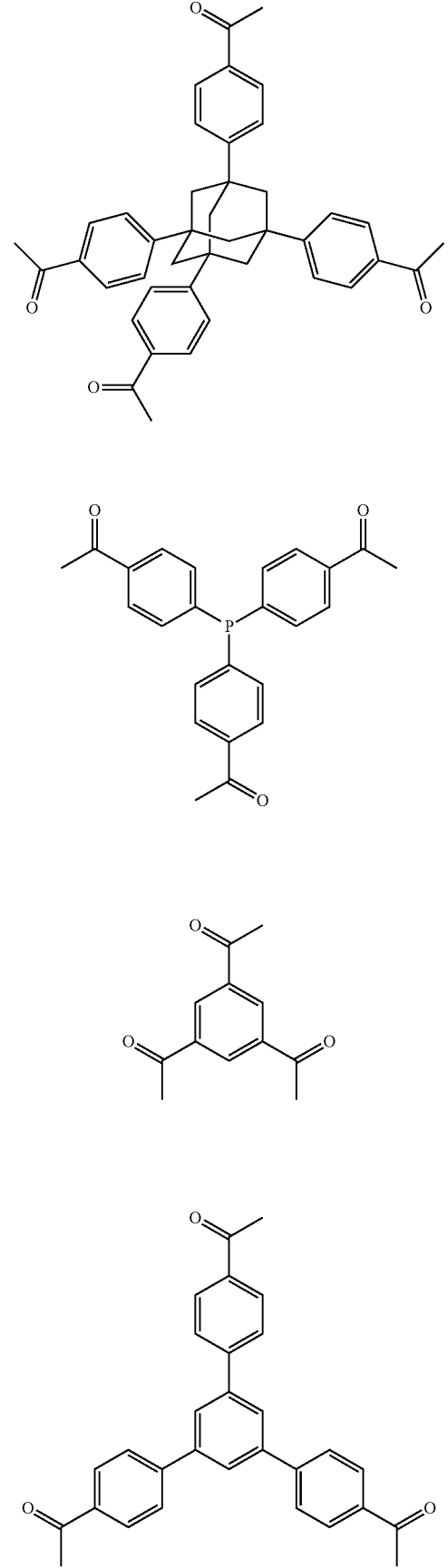

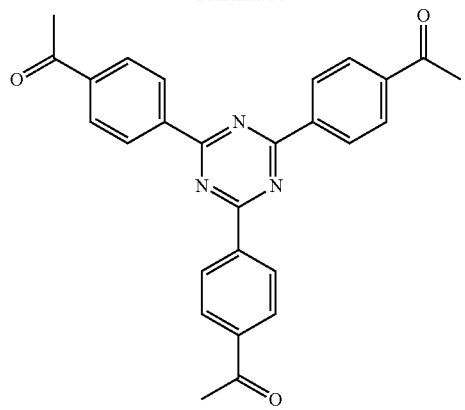
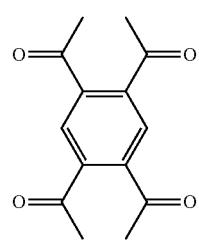
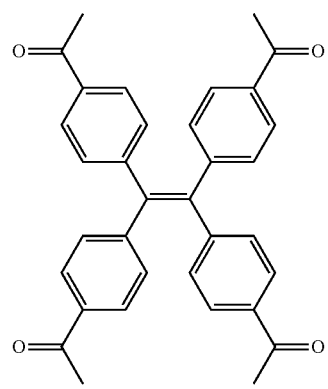
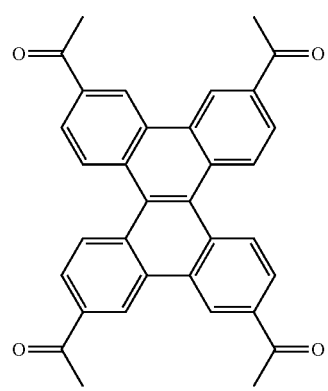
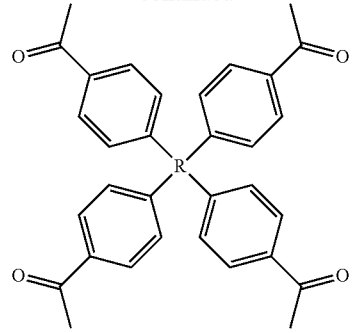
(Square/rectangle)
wherein R =
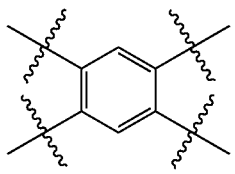
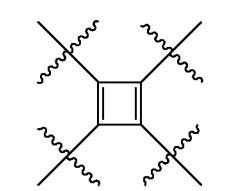
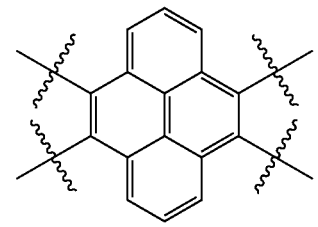
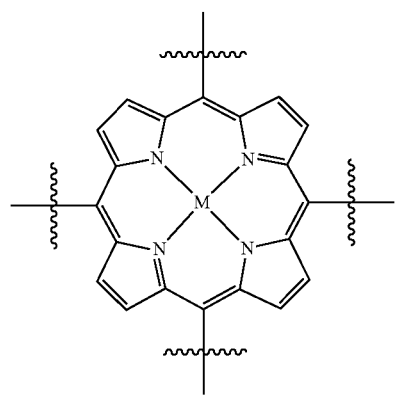
(wherein M = 2H or any metal)
In one embodiment, said porous polymer network produced has a basic structure selected from the group consisting of

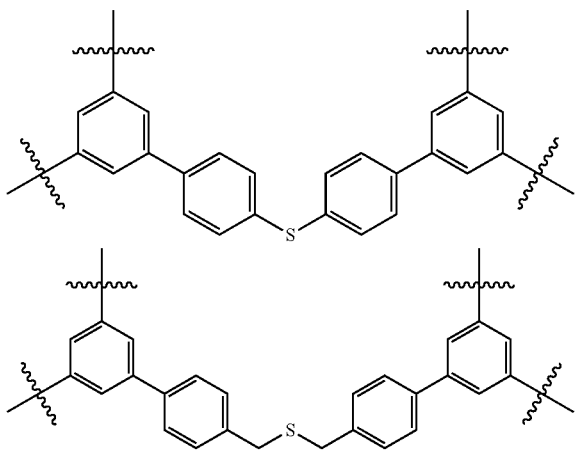

In one embodiment, said porous polymer network comprises a metal absorbing porous polymer network. In one embodiment, said conjugated porous polymer network produced has a specific surface area of greater than 1000 m²/g, with a pore volume of 0.40 cm³/g. In one embodiment, said conditions comprises creating a homogenous solution of at least one compound comprising at least one acetyl group and methanesulfonic acid. In one embodiment, said conditions comprises heating. In one embodiment, said method further comprises step (c) wherein said acid is neutralized by aqueous base, in one embodiment, said method further comprises step (d) wherein said conjugated porous polymer network is extracted with an organic solvent. In one embodiment, said method further comprises step (e) wherein said conjugated porous polymer network is purified by flash column chromatography. In one embodiment, said method further comprises fabrication of a porous polymer network film comprising: providing: a first glass substrate and a second glass substrate: i) deposition of portion of said solution upon said first glass substrate, ii) application of said second glass substrate upon said first glass substrate with deposited solution, and iii) heating said substrates under such conditions to produce a porous polymer network film.

Introduction

This invention provides a new scalable synthetic method for the preparation of conjugated porous polymer networks (cPPN) through inexpensive Aldol triple condensation reaction mediated by methanesulfonic acid (MSA). This process is a highly efficient tandem transformation that fuses three aromatic acetyl groups into one benzene ring. A wide scope of different cPPN were achieved from the corresponding acetyl functionalized substrates. The unique reaction condition allows for solution process of the cPPN using a "casting-followed-by-reaction" strategy. This unique and versatile synthetic approach features mild conditions, low cost, excellent efficiency, and wide substrate scope, affording processed, highly porous cPPNs with controllable pore size distribution and properties.

This low cost, highly efficient, versatile synthetic method may be used for the mass production of cPPNs, which are useful for gas storage, gas separation, energy storage, catalysis and fabricating electronic devices. Compared to their non-conjugated counterparts, cPPNs possess higher thermal and chemical stability, as well as superior charge carrier conductivity. In addition, porous thin film of these cPPN materials can be solution-processed for device fabrication. Commercial product of the bulk cPPN materials, and the processed cPPN thin films will be developed using this method.

In recent years, microporous materials, such as metal-organic frameworks (MOFs), covalent organic frameworks (COFs), and conjugated porous polymer networks (cPPNs), draw tremendous industrial attentions because of their applications in gas storage, energy storage, catalysis and molecular separations. Most reported synthetic strategy for cPPNs, however, relies on noble metal-catalyzed cross-coupling reactions, which are expensive and often leave behind residue metal contamination. This invention uses inexpensive MSA (99% pure <$2,000/metric ton) to mediate the reaction so that noble metal is not involved in the potential mass production. The catalyst residue can be readily removed by means of ethanol wash. Moreover, the unique physical property of MSA and the high efficiency of the reaction allows for solution process of the cPPNs into thin films that is ready for advanced device fabrication.

Advantageous Aspect 1: Methanesulfonic acid as an inexpensive yet environmentally benign reagent was introduced for the first time in aldol triple condensation reaction to construct cPPNs. In contrast, previously reported aldol triple condensation for porous materials required toxic or unstable reagents, such as silicon tetrachloride, 4-methylbenzenesulfonic acid and thionyl chloride, limiting its practical applications suitable for commercialization. Compare to these acid catalysis, methanesulfonic acid possess low toxic, mild reaction condition and easy to handle characteristics. More importantly, methanesulfonic acid is a liquid acid so that it allows for solution processing of the reaction precursors into different forms.

Advantageous Aspect 2: Previously reported methods for cPPNs are sensitive to water or oxygen so that sealed tube or nitrogen protected vessels are required for those processes. These requirements add undesired risk and cost to mass production of cPPN materials. This invention provides a method that can be performed under ambient condition (open air) which allows for inexpensive reaction operation.

Advantageous Aspect 3: This invention also enables thin film preparation of cPPNs through a "casting followed-by-reaction", overcoming the generally formidable challenges in processing insoluble polymer networks. This ability opens the door of incorporating, cPPN thin films into products such as sensors and energy storage devices.

By applying the synthetic strategy, we are planning to functionalize the starting materials with different functional groups. The corresponding conjugated porous polymer networks will be employed in gas adsorption, device processing and lithium-ion battery application.

In one embodiment, the invention relates to a highly efficient, aldol triple condensation method for scalable synthesis of conjugated porous polymer networks. It is believed that this strategy features low cost, simple starting material and reagent, as well as feasible operation, ideal for mass production of bottom-up synthesized organic porous materials. In addition, this method enables solution processing of porous polymer materials through a "casting-followed-by-reaction" strategy into desired forms that are essential for practical applications.

Bottom-up synthesized microporous materials, such as metal organic frameworks NM) [7, 8], covalent organic[9] frameworks (COFs) [9, 10] and porous polymer networks (PPNs) [6, 11-13], demonstrates promising potential applications in gas storage [14], catalysis [15, 16] and molecular separations [8, 17], etc. Among them, PPNs are non-crystalline materials constructed by irreversible reactions, such as Suzuki [18, 19], Sonogashira [20, 21], and Yamamoto coupling [12]. The resulting rigid yet conjugated connections endow high porosity and extraordinary stability to PPNs. In contrast, highly crystalline MOFs and COFs are less robust in harsh conditions because of the reversible and dynamic bond formation during their synthesis [22, 23]. Therefore, PPNs are considered an appropriate candidate material for processes and operations under harsh conditions. The large-scale production and applications of PPNs, however, confronts two major challenges: On one hand, the commonly used reactions for PPNs synthesis are sensitive to atmosphere and often require expensive metal catalysts/reagents, adding undesired risk and cost to the potential mass production. On the other hand, the cross-linked nature of PPNs prohibited feasible processing of these insoluble materials into forms relevant to many practical applications. For example, the processing of PPN into membrane and thin films are essential for their applications in gas/solution ultrafiltration [1, 2] or highly sensitive electrical sensors [3-5].

Under such circumstances, there is an urgent demand on cost effective synthetic method for PPN that allows for scalable production of the materials and feasible solution processing. In order to achieve this goal, several design principles should be followed. First, the backbone structure of porous materials should be rigid and composed of aromatic $sp^2$ building blocks. The rigid backbone constitution can support the persistent porous architecture while the $sp^2$ conjugation leads to high chemical and thermal stability. Second, the starting materials, reagents/catalysts and solvents should be low cost and environmentally benign and the reaction should not sensitive to moisture and air. Last but not least, liquid-phase reaction with minimized number of reagents/catalysts is preferred, so that the liquid reaction mixture could be used as precursor for solution-processing. Herein, a methanesulfonic acid (MSA) mediated aldol triple condensation reaction that addresses these challenges simultaneously is described. This method offers a green strategy for the mass production of highly stable PPN meanwhile enables solution-phase processing of these materials into uniform films and potential composite membranes for advanced applications.

Aldol condensation is an effective reaction to construct carbon-carbon bonds and widely used in organic synthesis [24]. In 1991, Elmosy et at reported a tandem aldol triple condensation (ATC) reaction that constructs a central benzene ring from aromatic acetyl groups [25]. In the presence of acid, this reaction involves two aldol condensation steps following by a [3+3] electrocyclic reaction and aromatization (FIG. 1a). Due to its highly efficient nature and the intriguing C3 symmetry of the products, ATC reaction has been widely used in the synthesis of star-shaped molecules [26] and dendrimers [27]. Recently, several groups also reported the preparation of organic microporous materials by using ATC reaction [28-30]. In these reactions, however, either toxic and irritate acid was used as catalysis, or the acids were easily decomposed at high temperature. Furthermore, all these methods required specialized reactors to protect the reaction from oxygen and moisture. Therefore, large-scale application of ATC reaction for PPNs synthesis was limited, not to mention feasible solution processing of PPNs.

One embodiment of the present invention envisioned that MSA could be an ideal acid for the ATC synthesis of PPN. Compared to the widely-explored acidic reagents for ATC reaction (such as silicon tetrachloride [25], 4-methylbenzenesulfonic acid [28, 30], sulfuric acid and thionyl chloride [29]), MSA is non-toxic, environmentally benign and stable at high temperature [31, 32]. More importantly, MSA is a liquid acid so that it can serve not only as the catalyst but also as the solvent in reaction. As shown in a model reaction (FIG. 1b) on acetophenone, 0.2 eq MSA was the only reagent used for the reaction without additional solvent. After 12 hours at 130° C. the product 1, 3, 5-triphenylbenzene was isolated in 86% yield. Compared to previously reported ACT reactions and metal catalyzed cross-coupling reactions commonly used for PPN synthesis, this method is easy to handle, free of solvent, and environmentally benign, while still maintaining a high efficiency. In this context, aromatic starting materials (M1 to M5) functionalized with multiple acetyl groups were prepared in order to synthesize the corresponding PPNs by using this promising MSA catalyzed ACT method (see Example 1-Example 3).

Result and Discussion 1, 4-diacetlybenzene (M1) was firstly carried out as model reaction to evaluate this method, M1 was suspended in an excess amount of MSA (10 eq) in a small vial. After heating for several minutes, M1 was fully dissolved in MSA. At the same time, the color of the solution was gradually turned from yellow to orange (FIG. 5), suggesting the formation of a highly conjugated π-system during the ATC reaction. After heating for 12 hours, a deep red conjugated microporous polymer (PPN1) was obtained by washing with ethanol in quantitative yield. An open glass vials were used as the reactor and no extra protective equipment were needed, demonstrating that the reaction is not sensitive to ambient oxygen or moisture. This feature can decrease the cost to prepare organic porous materials significantly.

Figure 2B:
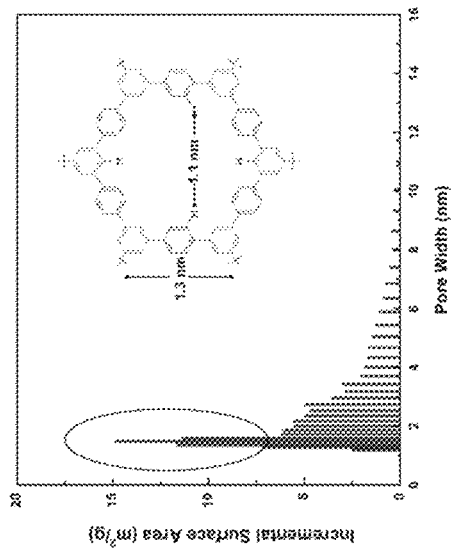
FIG. 2b shows the relationship between the reaction temperature and BET surface area for PPN1.
Figure 2C:
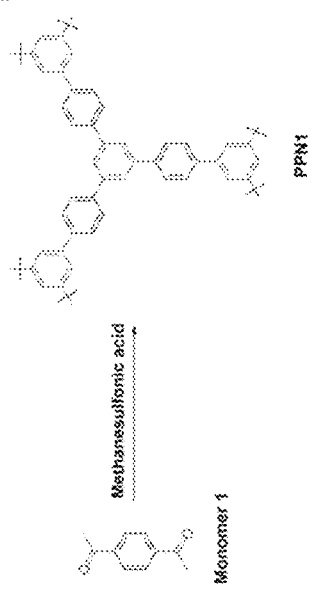
FIG. 2c shows the 77 K $N_2$ sorption isotherms.
Figure 2D:
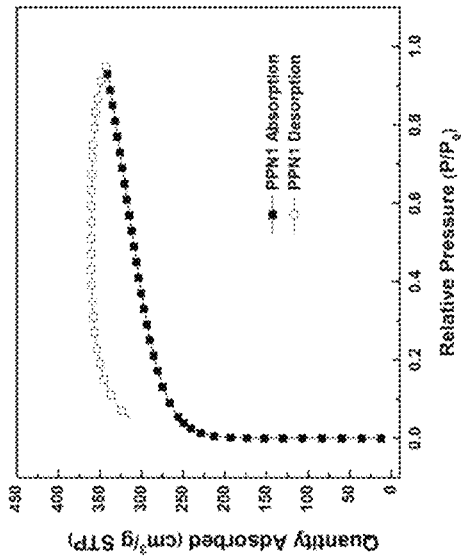
FIG. 2d shows the pore size distribution of PPN1 at 110° reaction temperature.

Nitrogen adsorption-desorption isotherm measurements were employed to analyze the porosity of PPN1. Brunauer-Emmet-Teller (BET) surface area was used as the parameter to optimize the reaction condition for highly porous products. The reactions were performed under different temperatures ranging from 100 to 150° C. When reaction temperature increased from 100 to 110° C., the BET surface area of PPN1 was increased (FIG. 2b). Higher temperature can increase the reaction rate and the solubility of polymeric intermediates in MSA, so higher reaction conversion was expected to increase the porosity and BET surface. However, the BET surface of PPN1 started to decrease monotonously when temperature increased from 110° C. to 150° C. This observation was attributed to the over-fast reaction rate at a higher temperature, the microporous network grew too quickly so that more defects were formed to give a lower BET surface. The optimized BET surface area of PPN1 was 1054 m$^2$/g, which was obtained from the reaction at 110° C. (FIG. 2c). This value represents the highest BET surface area obtained in ATC synthesized PPNs [28, 29, 33]. The pore size distribution of this sample was measured by nitrogen adsorption-desorption isotherm at 77K (FIG. 2d). Majority of the pore sizes were less than 10 nm and are mainly in the range of 1~2 nm. This result agrees with the diameter of smallest repeating cyclic structure in the polymer networks while considering the kinetically trapped larger defect pores.

Figure 3A:
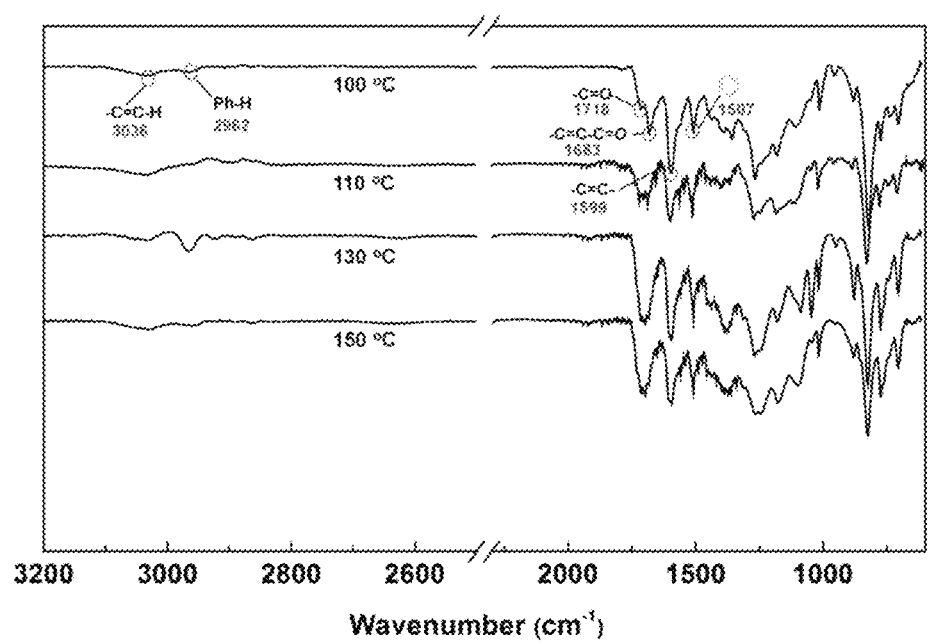
FIG. 3a shows a FT-IR spectroscopy of PPN1 at different reaction temperatures (100° C., 110° C., 130° C. and 150° C.).
Figure 3B:
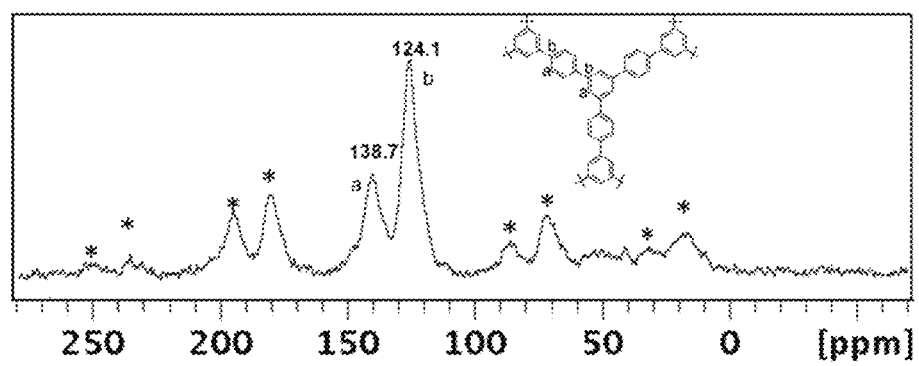
FIG. 3b shows the $^{13}$C CP/MAS NMR spectra of the PPN1 at 110° C. reaction temperature recorded at MAS rate of 5 kHz, asterisks (*) indicate rotational sidebands.
Figure 6:
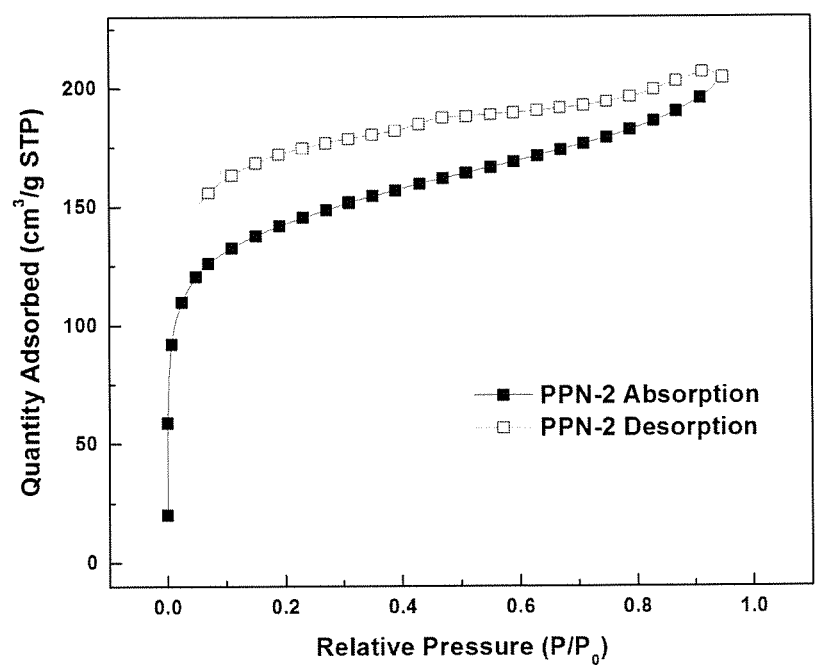
FIG. 6 shows a $N_2$ Absorption Isotherms of PPN2 at 77K.
Figure 7:
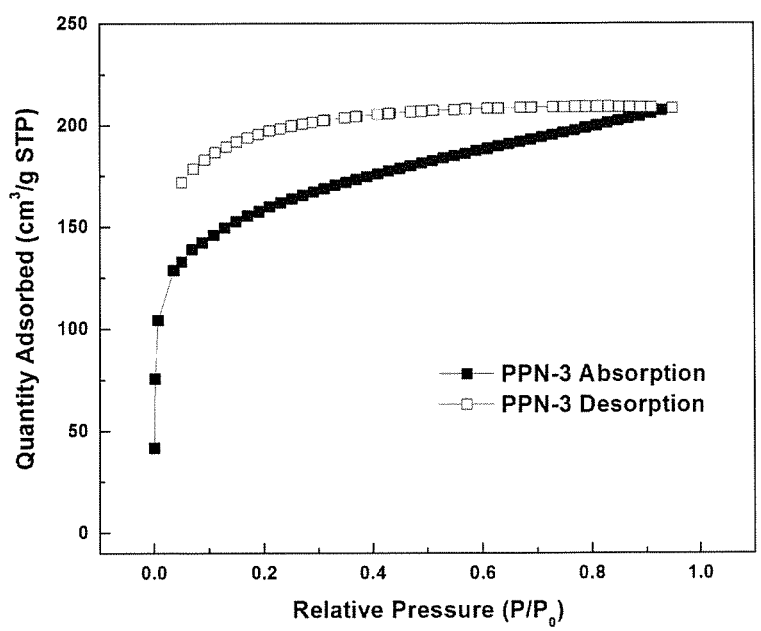
FIG. 7 shows a $N_2$ Absorption Isotherms of PPN3 at 77K.
Figure 8:
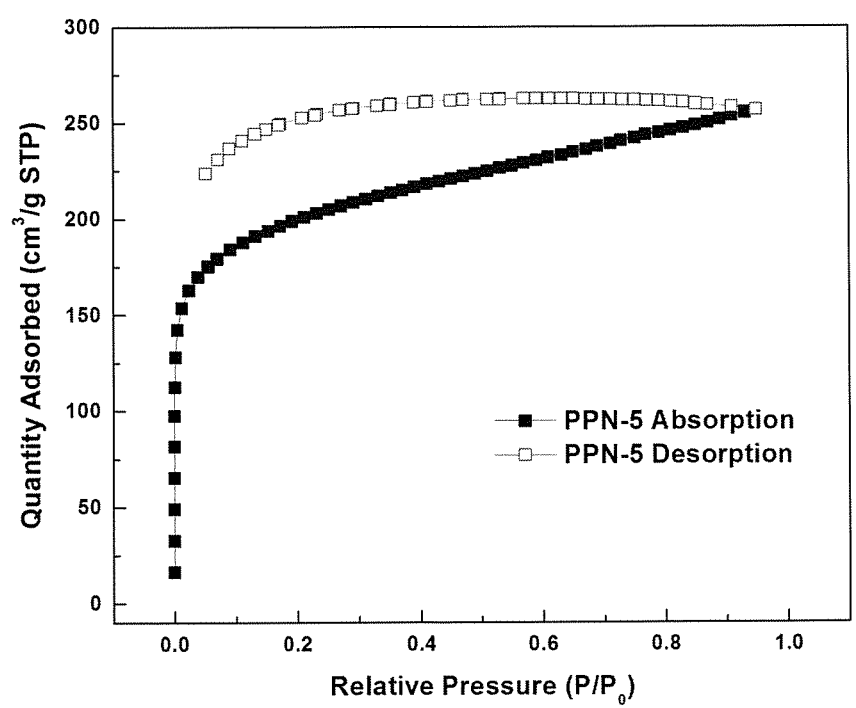
FIG. 8 shows a $N_2$ Absorption Isotherms of PPN5 at 77K.
Figure 9:
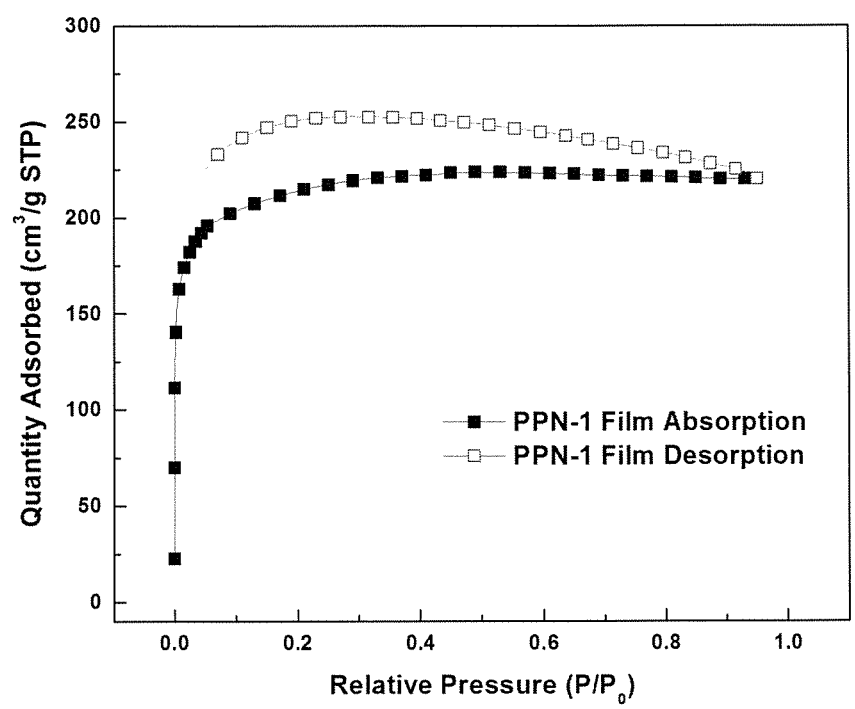
FIG. 9 shows a $N_2$ Absorption Isotherms of PPN1 film at 77K.

The PPN1 structure was also investigated by FT-IR spectroscopy. As shown in FIG. 3a, there are two peaks around 1700 cm$^{-1}$). For corresponding to carbonyl stretching of unreacted acetyl group (1718 cm$^{-1}$) and α, β-unsaturated ketone (1683 cm$^{-1}$). For the PPN1 formed at a lower temperature (100° C.), the strong peak associated with acetyl groups indicated that a large fraction of the acetyl groups were unreacted due to the relative low reaction temperature. When the temperature was increased, the peak of acetyl group was weakened significantly and the intensity of the α, β-unsaturated ketone peak was increased. For the PPNs formed at temperatures higher than 100° C., the relative intensity of the benzene, stretching peak (1507 cm$^{-1}$) compared to α, β-unsaturated ketone (1683 cm$^{-1}$) was firstly increased from 100° C. to 110° C. then decreased from 110° C. to 150° C. This result agreed with the conclusion made from the BET surface area measurements (FIG. 2b). Further structure elucidation of PPN1 was performed by using solid-state $^{13}$C CP/MAS NMR spectroscopy (FIG. 3b). Two major signals at chemical shift of 138.7 and 124.1 ppm were identified as the aromatic carbon with one proton (unsubstituted benzene carbon) and without proton (substituted benzene carbon). This result agreed with the proposed PPN1 structure as shown in FIG. 3a. Due to the low sensitivity of this method, however, the expected peaks corresponding to defects, such as acetyl group and α, β-unsaturated ketone, were not found. In addition, elementary analysis (Table 1) result demonstrated that there was still oxygen in PPN1, corresponding to these defects.

TABLE 1

Results of the elemental analysis

|  | C(%) | H(%) | N(%) | O(%) |
|---|---|---|---|---|
| PPN1 (experiment) | 84.64 | 4.95 | N/A | 10.41$^a$ |
| PPN1 (theoretical) | 95.21 | 4.79 | 0 | 0 |
| PPN2 (experiment) | 79.91 | 5.14 | N/A | 14.95$^a$ |
| PPN2 (theoretical) | 88.05 | 4.62 | 0 | 7.33 |
| PPN3 (experiment) | 71.23 | 4.92 | N/A | N/A |
| PPN3 (theoretical) | 71.85 | 4.31 | 0 | 0 |
| PPN4 (experiment) | 85.70 | 4.78 | N/A | 9.52$^a$ |
| PPN4 (theoretical) | 95.57 | 4.43 | 0 | 0 |
| PPN5 (experiment) | 81.55 | 4.98 | 3.98 | 9.49$^a$ |
| PPN5 (theoretical) | 90.82 | 4.76 | 4.41 | 0 |

$^a$Estimated from C, H and N atoms.

TABLE 2

Porosity of Microporous Polymer PPN1 to PPN5

| Microporous polymer | Monomer | $S_{BET}$ (m$^2$/g)$^a$ | $V_{micro}$ (cm$^3$/g)$^b$ | $V_{total}$ (cm$^3$/g)$^c$ |
|---|---|---|---|---|
| PPM | M1 | 1054 | 0.28 | 0.42 |
| PPN2 | M2 | 515 | 0.04 | 0.20 |
| PPN3 | M3 | 699 | 0.04 | 0.25 |
| PPN4 | M4 | N/A | N/A | N/A |
| PPN5 | M5 | 729 | 0.17 | 0.31 |
| PPN1 film | M1 | 802 | 0.14 | 0.28 |

$^a$Surface area calculated from nitrogen adsorption-desorption isotherm at 77K using the BET method.
$^b$Micropore volume calculated from nitrogen adsorption isotherm using the t-plot method.
$^c$Total pore volume at P/P$_0$ = 0.97.

Figure 10:
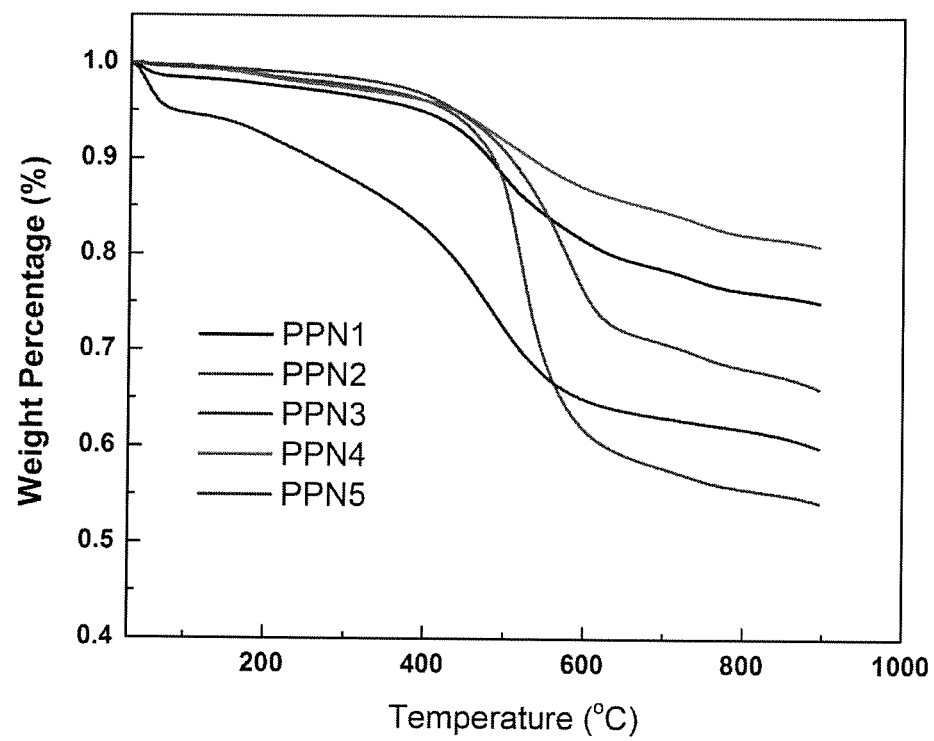
FIG. 10 shows a TGA trace of PPN1-PPN5.

PPN2 to PPN5 were synthesized using the optimized reaction condition. The porosity properties were summarized in Table 2, The BET surface area of PPN2, PPN3 and PPN5 were lower than that of PPN1. This decrease in porosity was attributed to the higher flexibility of M2, M3 and M5 compare to M1, and the possibility of network interpenetration due to their longer length. Interestingly, PPN4 showed very low porosity, likely because of the low reactivity of the acetyl groups on M4 and low stability of spirofluorene. N$_2$ absorption isotherms for PPN1, PPN2, PPN3 and PPN5 at 77K (FIG. 2c, FIG. 6, FIG. 7, FIG. 8, and FIG. 9) showed high gas uptake at low relative pressures and a flat course in the intermediate section, which is typical type 1 adsorption-desorption isotherms. Thermogravimetric analysis (TGA) was performed to measure the thermal stability of PPN1-PPN5 (FIG. 10). PPN3 showed a distinctive weight loss before 200° because of the lower thermal stability of ferrocene unit. Other than PPN3, all other samples demonstrated good thermal stability with decomposition temperature over 400° C. because of the robust nature of their rigid aromatic backbones.

Although organic porous materials have been developed for many years, it is still a formidable challenge to process high quality thin films or membranes of PPNs or COFs [34, 35]. The rigid cross-linked network of these porous materials makes it almost impossible to solubilize or melt the materials for solution- or melt-processing. In this case, however, this processing problem can be addressed by taking advantage of the features of this MSA mediated ATC reaction: Because MSA serves as the catalyst and the solvent simultaneously, this unique reaction condition allows for a simple "casting-followed-by-reaction" strategy to fabricate a film of this organic porous network. MSA solution of M1 was dropped onto a glass substrate with two small pieces of glass as holder (FIG. 4a). Another slide of glass was covered onto the substrate so that the MSA solution was confined in this mold made of glass slides. This set up was heated to 110° C. for 24 hours to allow the formation of the PPN as a thin film. The color changed from orange to deep red (FIG. 4b and FIG. 4c), matching the color change in the bulky solution reaction. After removing the top substrate, the as synthesized organic porous films were easily peeled off by treatment of ethanol to obtain a freestanding film (FIG. 4d). N$_2$ adsorption-desorption isotherm measurement on this PPN1 thin film gave a BET surface area of 802 m$^2$/g, demonstrating excellent porosity of the material synthesized in a thin film state. Under scanning electron microscope (SEM), PPN1 film exhibited a smooth surface and uniform thickness. Overall, successful preparation of PPN1 films from a solution precursor enables future processing of PPN materials into various forms including thin films, fibers, molded shapes, and as composites with supporting materials, paving the way for practical applications of these porous materials in separation, filtration, and sensing.

In summary cost effective syntheses of organic microporous polymer networks are achieved by using methanesulfonic acid (MSA) mediated aldol triple condensation reaction. A series of porous polymer networks were obtained in highly yields. This method shows significant feasibility compared to previous reported similar methods, on account of the low toxic, environmentally benign and stable characters of MSA as well as the simple reaction setup. Specific surface area of these porous materials can reach 1054 m$^2$/g with a pore volume of 0.42 cm$^3$/g. The simple composition of the precursor solution in MSA allows for solution processing of porous thin films of these insoluble polymer networks through a "casting-followed-by-reaction" strategy. These unique characteristics make this method a promising strategy to mass produce and process functional microporous materials for heterogeneous catalysis, separation, and gas storage.

EXAMPLES

The following examples are provided in order to demonstrate and further illustrate certain preferred embodiments and aspects of the present invention and are not to be construed as limiting the scope thereof.

Example 1

Synthesis 1,3,5-triphenylbenzene, Acetophenone (500 mg, 4.17 mmol) and methanesulfonic acid (80 mg, 0.83 mmol) was added to a 25 mL round flask. The mixture was stirred at 130° C. for 12 h. It was subsequently neutralized by saturated NaHCO$_3$ and extracted with CH$_2$Cl$_2$ (3×20 mL). The combined organic layers were dried by MgSO$_4$, filtered, and concentrated in vacuum. The residue was purified by flash column chromatography (SiO$_2$, Hexane) to give the product as white solid (364 mg, 1.19 mmol, 85.7%).

Example 2

General procedure of PPN synthesis by MSA catalyzed ATC reaction. To a 20 mL glass vial with cap, the monomer (1 equivalent) and methanessulfonic acid (10 to 20 equivalents) was added and pre-heated to 40° C. so that a homogenously solution is obtained. The solution was subsequently heated at 110° C. for 12 hours. A deep colored monolithic solid was obtained. After washing with water extensively, the solid was wash with ethanol for 24 hours in a Soxhlet extractor. The product was dried under vacuum at 120° C. for 12 hours.

Example 3

PPN1 film fabrication procedure. Monomer 1 (90 mg) and methanesulfonic acid (1 mL) were added in a test tube. The mixture was heated up to 60° C. to become a homogenous solution. Several droplets of the solution were deposited onto a glass substrate. Two slides of micro cover glass were placed at the edge of the substrate and another glass substrate was covered on the solution drops. The glass substrates used in film fabrication were pre-cleaned by CH$_2$Cl$_2$ and coated with a spray-coated thin layer of PTFE releasing agent. Then the glass substrates were heated at 110° C. for 24 h. deep colored film was obtained. The film was transferred into a Soxhlet extractor and washed with ethanol for 24 hours.

Example 4

M2[1], M3[2], and M5[5] were synthesized according to procedure reported in the literature [36-39], M1 and other starting reagents were purchased from Aldrich and Alfa-Aesar and used as received without further purification, Thermogravimetric analysis (TGA) data were collected on Mettle-Toledo TGA-DSC-1 with heating rate 10° C./min from 30° C. to 900° C. under N$_2$ atmosphere. Solid state nuclear magnetic resonance (NMR) data were collected on Broker Advance-400 Solids NMR spectrometer. N$_2$ adsorption data were collected on a Micrometrics ASAP 2020 surface area and pore size analyzer.

Example 5

Spray Coating of PTFE on Glass Substrate

The glass substrate was first rinsed by acetone. Subsequently, a thin layer of PTFE was spray-coated on substrate. After that, the substrate was placed in an oven at 315° C. for 1 h.

Example 6

Cost Estimation and Stability

The start materials and reagents for the production of diphenyl ether derived PPN (PPN2) are all inexpensive commodity industry chemicals: diphenyl ether ($3,000-5,000/ton), aluminum chloride ($1,000-2,000/ton), CH$_3$COCl ($2,000-3,000/ton), MSA ($1,000/ton). Moreover, the yield of both synthetic steps from diphenyl ether to PPN2 are high (over/80% and quantitative). Based on these data, it could be estimated that the cost to synthesize PPN2 is much lower than current prevailing PPN production methods. For example, it is three orders of magnitude cheaper the cost for producing benchmark PPN6 (BET surface=6000 m$^2$/g). This cost-efficiency is particular advantageous for industrial applications that do not require ultrahigh porosity, e.g. filtration and sensing, PPNs prepared by our method show high thermal stability up to 400° C., which is highly desired in industrial areas.

Example 7

Advantages of the Solution Precursor Method

Figure 11A:
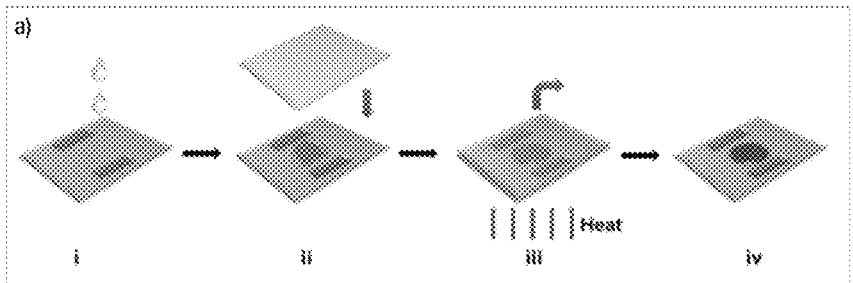
FIG. 11a shows fabrication method of PPN film.
Figure 11B:
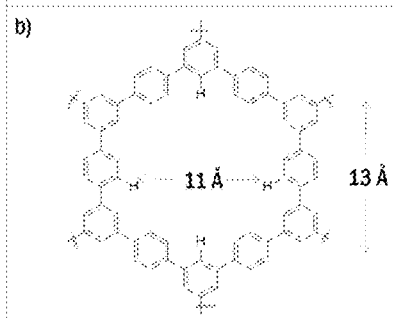
FIG. 11b shows PPN1 structure and pore size.
Figure 11C:
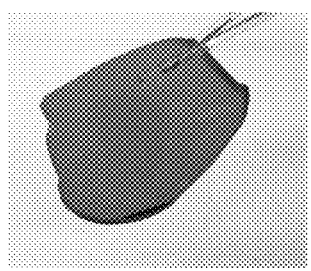
FIG. 11c shows a digital picture of free standing PPN1 film.
Figure 12:
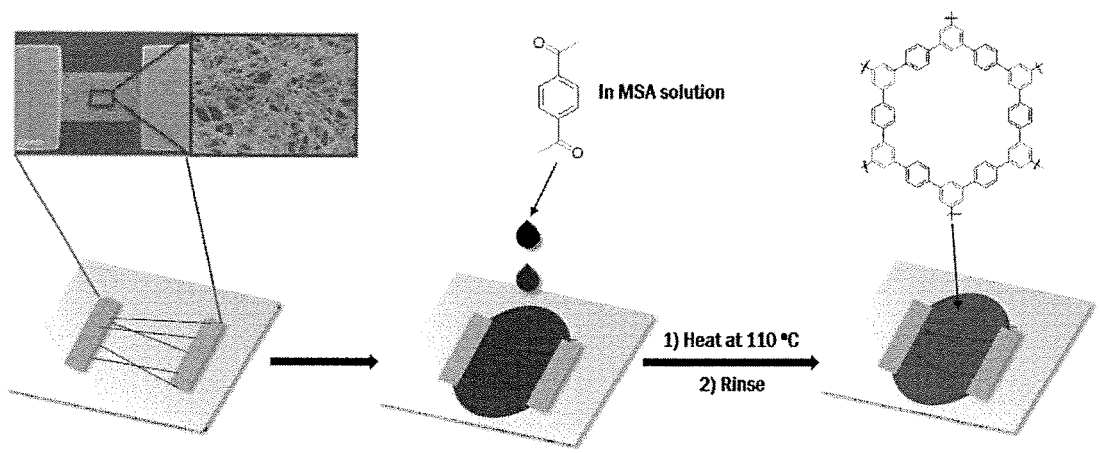
FIG. 12 shows a schematic concept of PPN/ carbon nanotube composites device. Potential applications can be expected in: ultrafiltration membranes, gas sensors, supercapacitors. All of these applications rely on high porosity integrated with high mechanical strength (ultrafiltration membrane), or high porosity with high electrical conductivity (gas sensor and supercapacitor). In one embodiment, other elements to be casted with PPN include, but is not limited to, metal nanowires, dendritic metal micro/nanoparticles, carbon nanofibers, redox active metaloxide nanoparticles ($MnO_2$), graphene, graphene oxide, and reduced graphene oxide.

In general, the processing of PPN into desired forms has been challenging because of the cross-linked and insoluble nature of PPN. This invention, however, enables solution-processing of the PPN precursor into different forms and its in-situ reaction, affording possibilities to porous product formation and applications that are not possible using conventional PPN synthesis. In addition, this method makes PPN much easier to process than other typical sp$^2$ carbon materials, such as carbon nanotubes. By casting the precursor solution on different functional substrates followed by crosslinking, PPN film could be fabricated and used for filtration and separation purpose. For example, the free-standing film could be formed and transferred onto other supports for different applications (FIG. 11a-c). In addition, the PPN products could be shaped as what we design by filling the solution of precursor into a mold. This solution method also allows for the integration of additives to the PPN matrix. For example, the introduction of fillers like graphene and carbon nanotube could enhance the electronic and mechanical performances of the PPN composite materials. The in-situ PPN formation also allows for an integrated sensor device composed of electronic active components and the PPN (FIG. 12). Finally, this method is also promising to solve problems associated with defects and pinholes in porous membranes. The PPN precursor solution filled in and the in-situ polymerization can be employed to afford a pinhole-free membrane.

Example 8

Industrial Application

Figure 13:
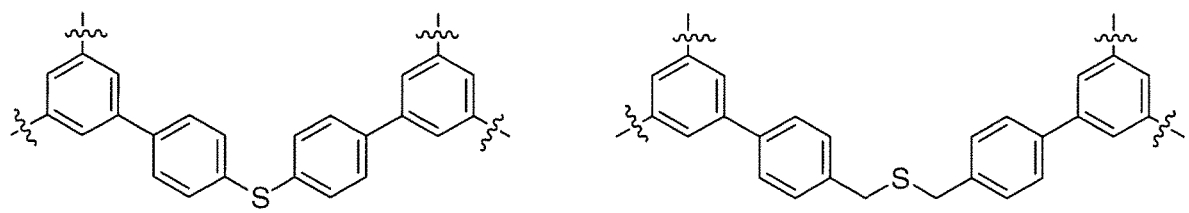
FIG. 13 shows the structure of two particular porous polymer networks. It is believed that these particular porous polymer networks may be useful in the industrial application of metal removal.

It is believed that some of these particular porous polymer networks may be useful in the industrial application of metal removal. FIG. 13 shows the structure of two particular porous polymer networks. These polymer networks may be synthesized in the methods previously described using previously described monomers/compound type are

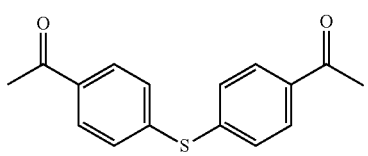

-continued

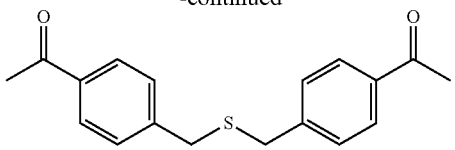

Example 9

Nanofiltratin Applications

The PPN films demonstrated excellent molecular filtration functions. In a filtration process under positive pressure, the film allows permeation of solvent molecules and small solute molecules, while solute molecules larger than the pore size are rejected. For example, the pore sizes of PPN1 film (made of 1,4-diacetyl benzene monomer) are mainly smaller than 2 nm, thus suitable for nanofiltration of molecules over 600 g/mol.

Figure 14:
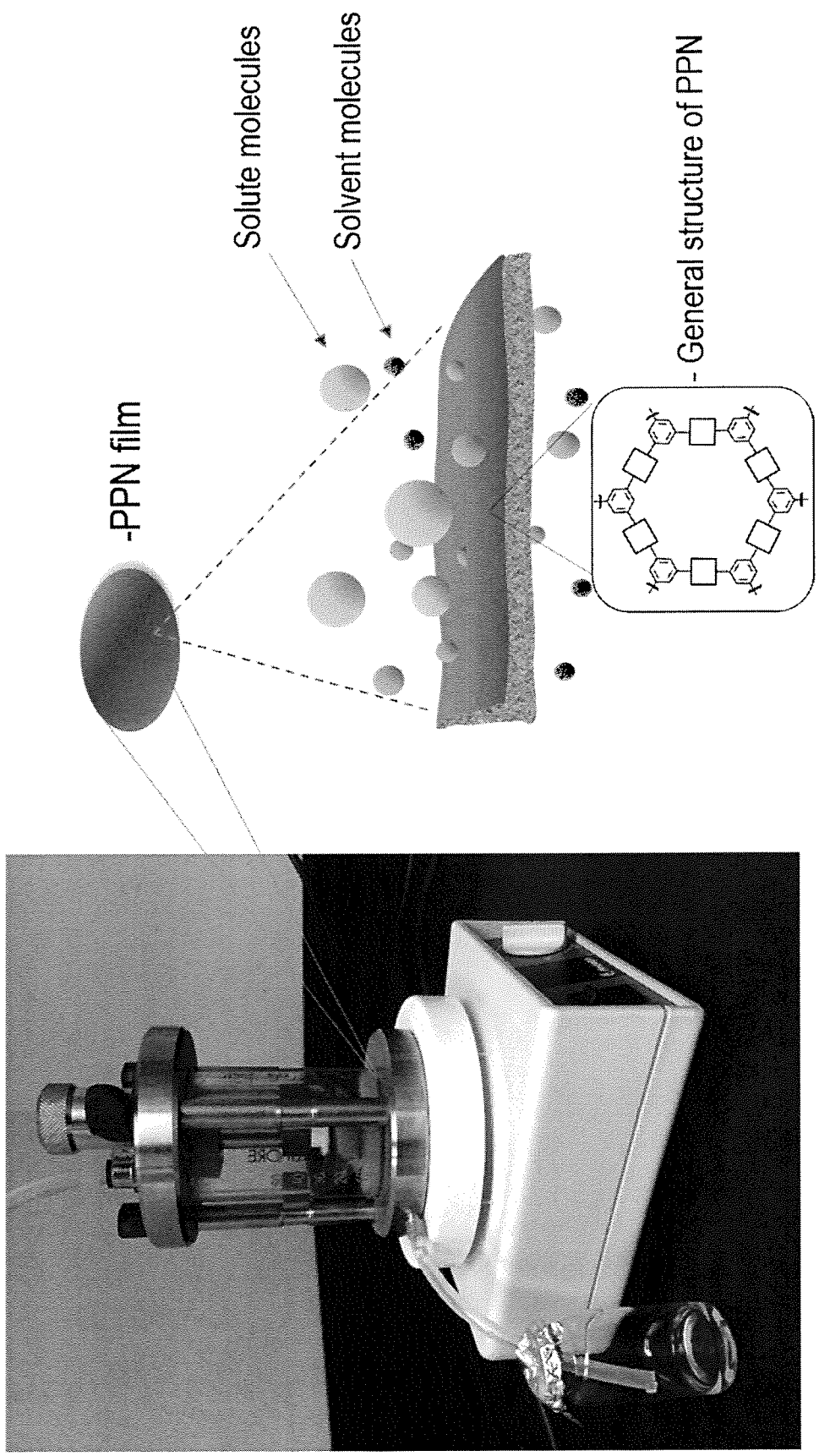
FIG. 14 shows one embodiment of a nanofiltration setup of PPN films.

In a standard nanofiltration setup, the free-standing PPN1 films were sealed by an aluminum foil tape, leaving the effective diameter of 1.8 cm exposed to the solution. Carbon fiber paper was used as a marcoporous support. The nanofiltration tests were conducted using a Millipore's solvent resistant stirred cell at 5 bar (FIG. 14). In order to ensure data reliability and reproducibility, target solution was filtrated at least 20 h before sample collection, so that the completion of adsorption and fouling of PPN films are achieved. Tested samples were collected for 30 min. The concentration of feed solution and permeate solution were calculated from the corresponding UV-vis light absorbance.

Figure 16:
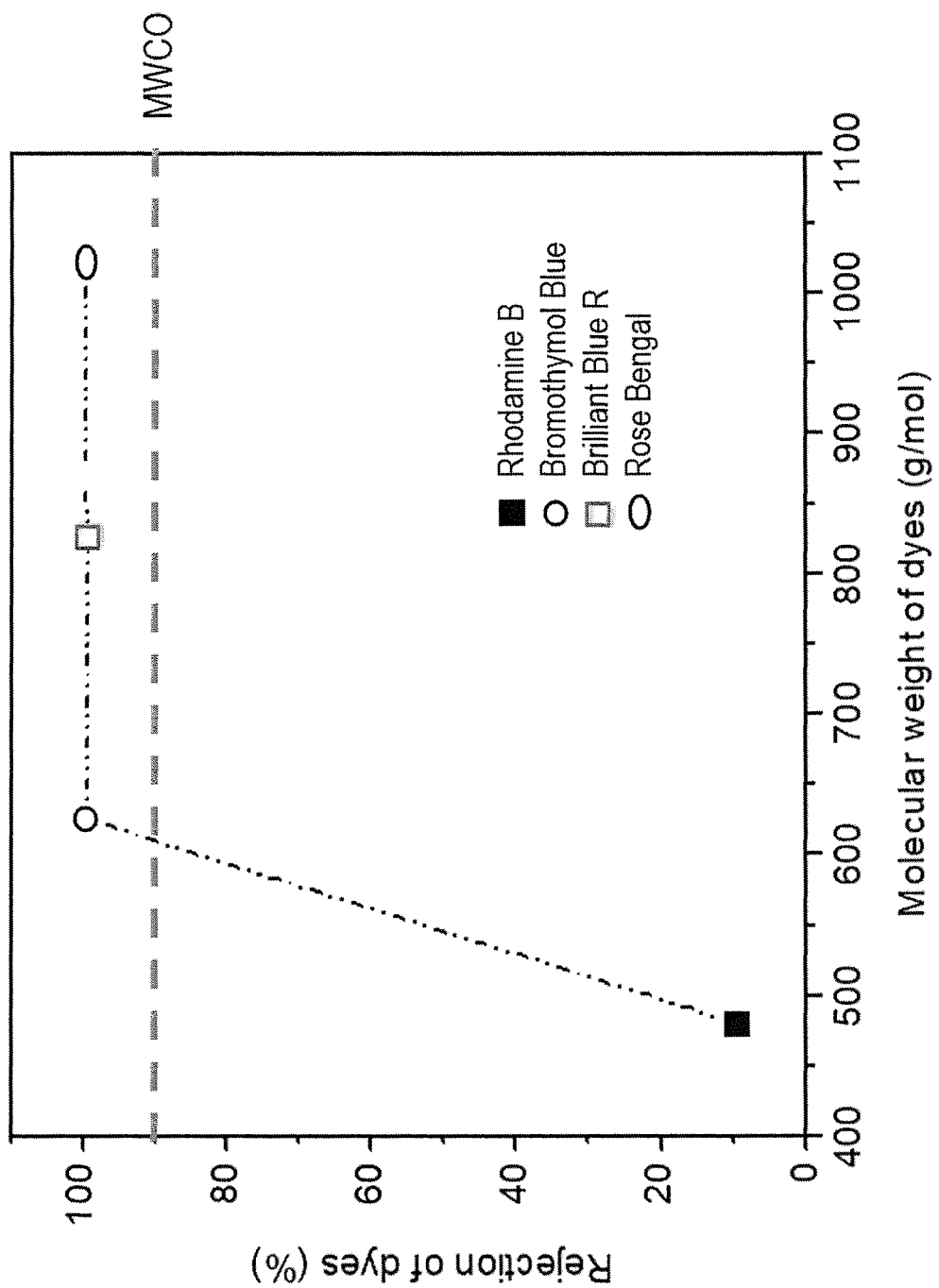
FIG. 16 shows the rejection rate of PPN1 film against organic dyes with different molecular weights: rhodamine B 480 g/mol, bromothymol blue 624 g/mol, brilliant blue 826 g/mol, rose bengal 1017 g/mol indicating a molecular weight cutoff for dye adsorption.
Figure 17:
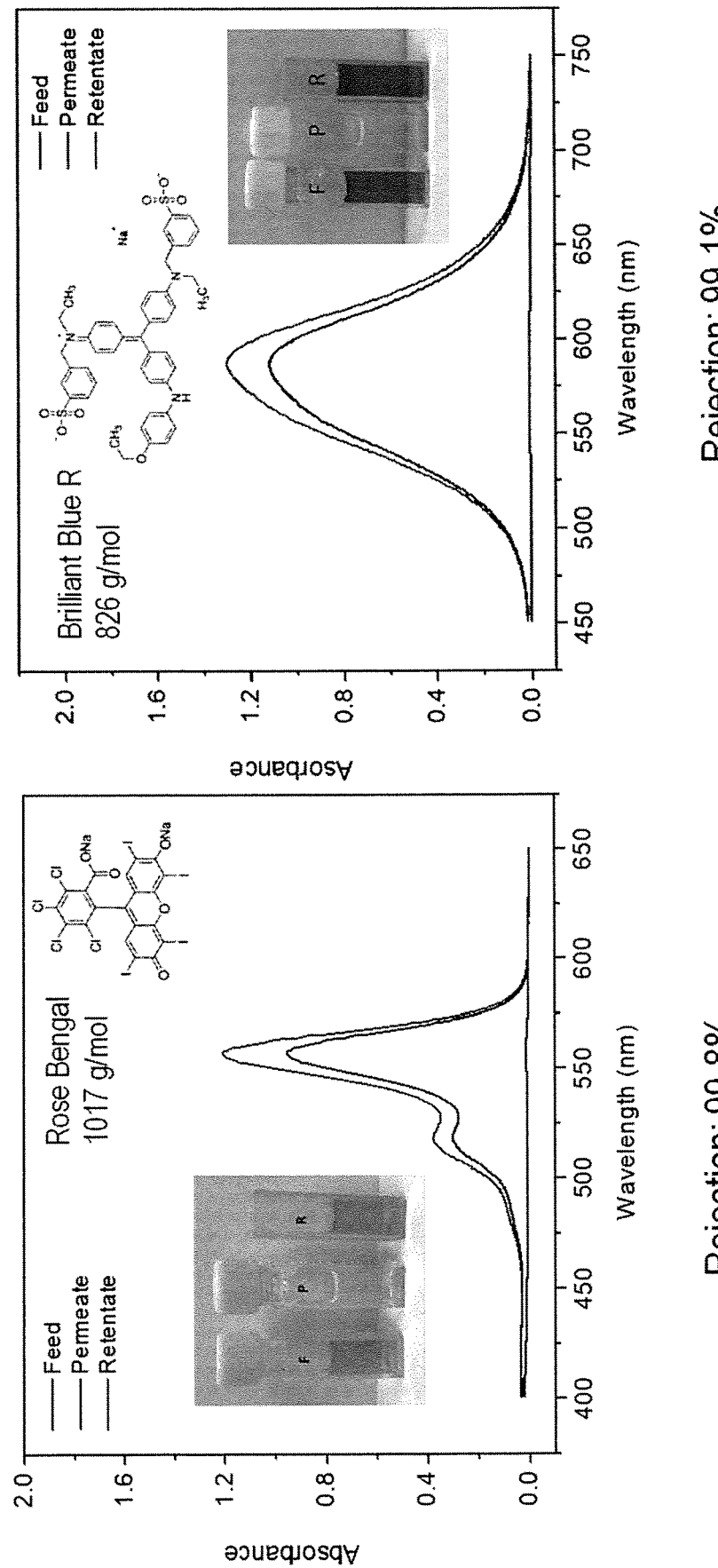
FIG. 17 shows dye rejection by PPN1 film of dyes Rose Bengal and Brilliant Blue R.

The PPN films demonstrated rejection >99% to solute molecules with molecular weight equal to or higher than 624 g/mol, while the rejection to smaller molecules such as Rhodamine B (480 g/mol) was as low as 9.4% (FIG. 16, FIG. 17, and FIG. 18). These results showed an outstanding selectivity of these PPN films against solutes of different sizes during nanofiltration. This selectivity is attributed to the narrow pore size distribution of PPN1 film.

Figure 19:
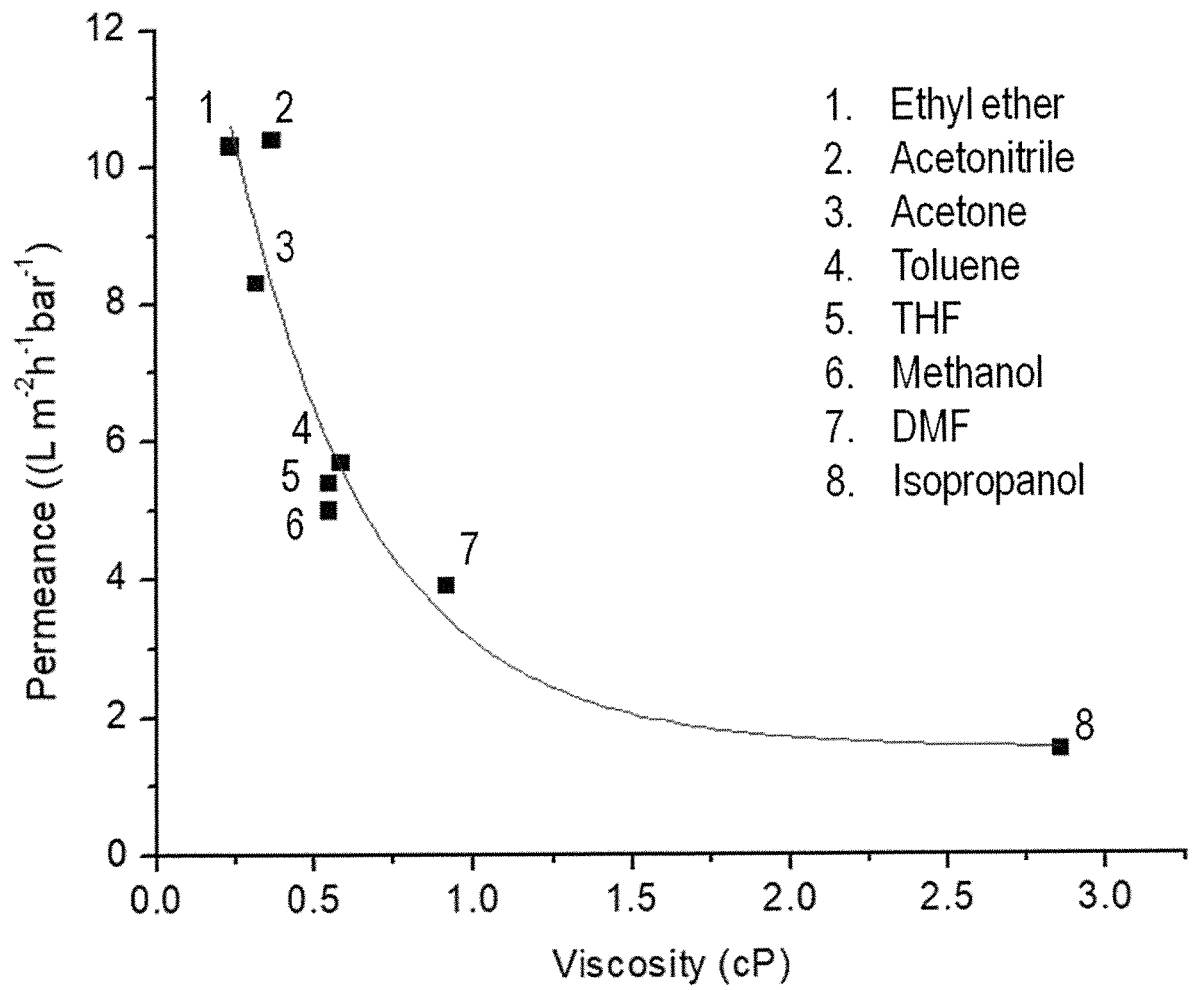
FIG. 19 shows the permeance of different solvents through PPN1 film.

As a result of the permanent high porosity (BET surface over 800 m$^2$/g), the permeance of PPN1 film is much better than commercial nanofiltration membranes. Compared to the market leading membrane DuraMem® 150 from Evonik, PPN1 films demonstrated 10 times higher methanol permeance (5.0 vs 0.48 L m$^{-2}$h$^{-1}$bar$^{-1}$) [40], 20 times higher acetonitrile permeance (10.2 vs 0.47 L m$^{-2}$h$^{-1}$bar$^{-1}$) [40], and 50 times higher tetrahydrofuran permeance (5.2 vs 0.1 L m$^{-2}$h$^{-1}$bar$^{-}$)[41]. Permeance of PPN1 film is also competitive comparing to the state-of-art nanofiltration membranes reported in literature. For example, the methanol permeance of PPN1 is in the same range with that of best reported cyclodextrin (5.8 L m$^{-2}$h$^{-1}$bar$^{-1}$)[42] and polyarylate (8.0 L m$^{-2}$h$^{-1}$bar$^{-1}$)[43] nanofiltration membranes. The advantage of our PPN1 films is that they could reach such high permeance at a 40 μm thickness so that the film is free-standing. In contrast, the high permeance competitors have to be at a few nanometers thick to achieve similar performance, leading to much more demanding fabrication conditions and much lower tolerance on defects. The present invention PPN1 films were processed by straightforward casting technique, feasible for large scale production. Moreover, PPN films show non-sensitive permeability to nonpolar, polar erotic, and polar aprotic solvents. The permeance of solvents depends only on the solvent viscosity (FIG. 19).

In one embodiment, said nanofiltration comprises heavy metal water filtration. In one embodiment, said heavy metal water filtration comprises water purification for pharmaceutical applications. In one embodiment, said heavy metal water filtration comprises soil remediation. In one embodiment, said heavy metal water filtration comprises ground water remediation. In one embodiment, said nanofiltration comprises size exclusion filtration. In one embodiment, said size exclusion filtration comprises chemical mixture separation. In one embodiment, said chemical mixture separation comprises filtration of heavy metals. In one embodiment, said chemical mixture separation comprises dye exclusion.

Example 10

Carbon Fiber Paper/PPM Composite Membrane Fabrication

Figure 20:
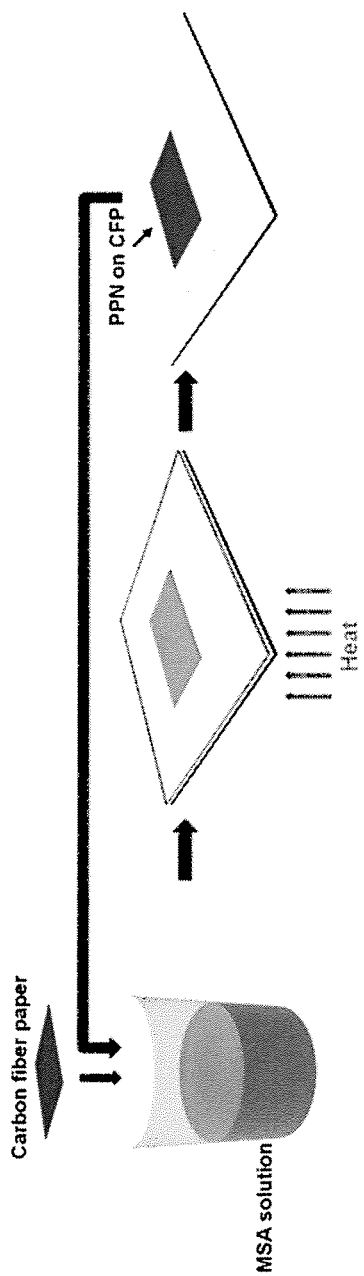
FIG. 20 shows the PPN1/CFP composites process
Figure 21:
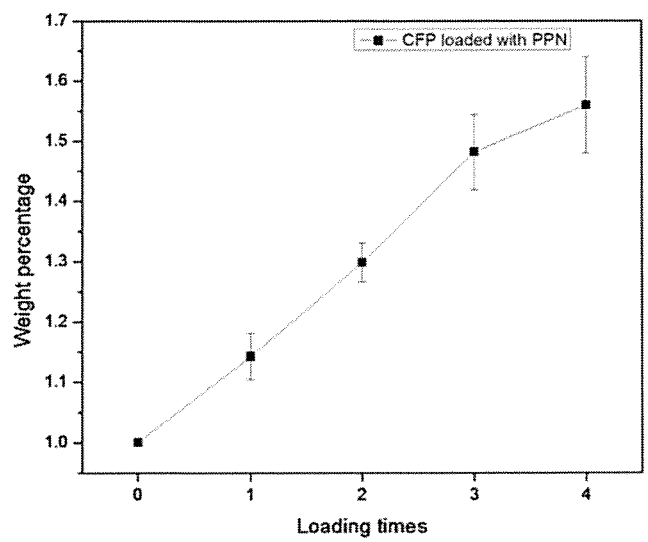
FIG. 21 shows weight percentage versus loading times for CH loaded with PPN.
Figure 22:
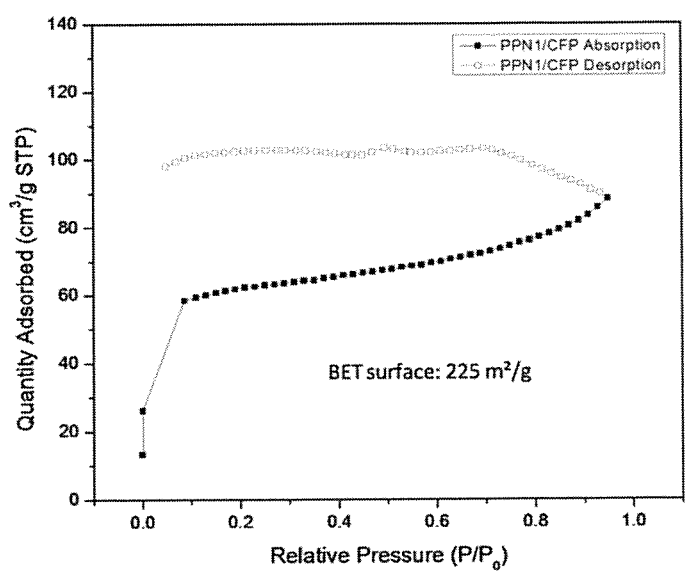
FIG. 22 shows the quantity adsorbed versus relative pressure for PPN1 adsorbtion and desorption.
Figure 25:
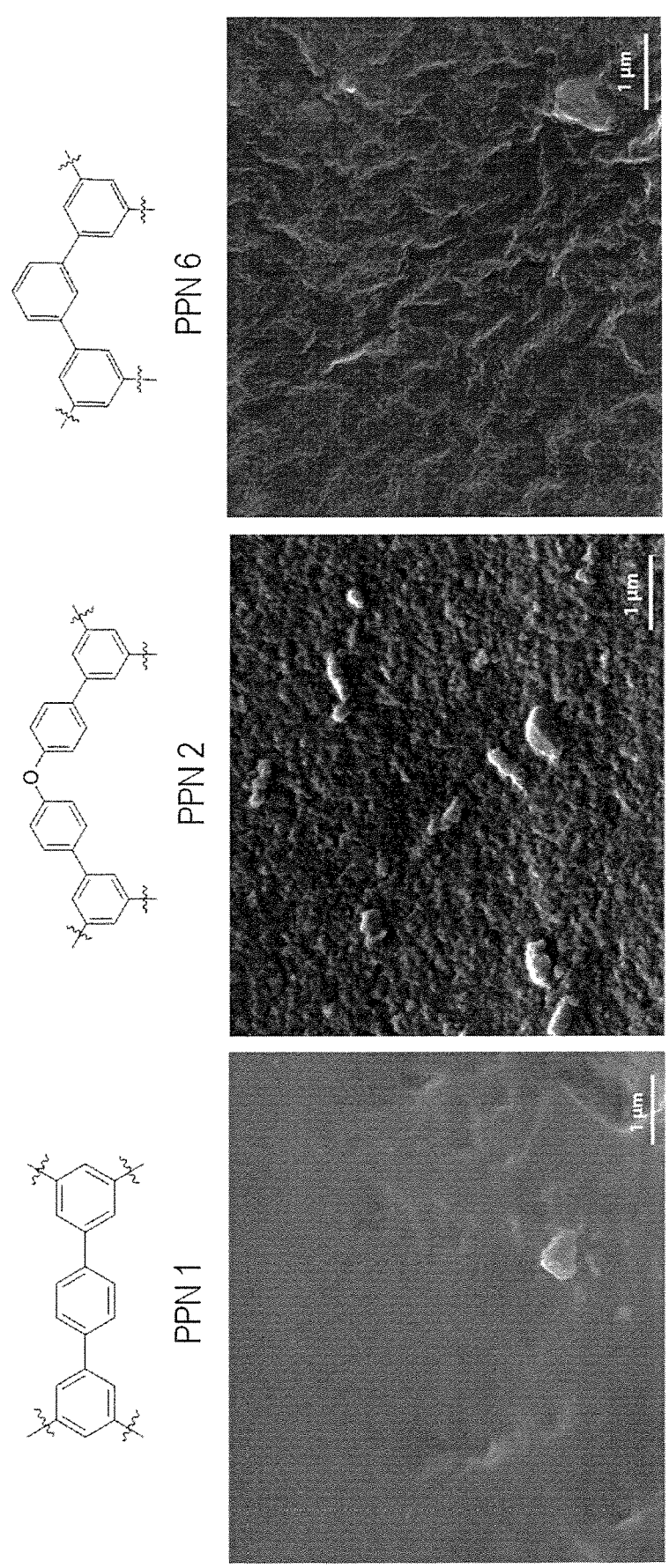
FIG. 25 shows a morphology study of various PPN films.

A piece of carbon fiber paper (CFP) was soaked in a solution of monomer 1 MSA (90 mg/mL), which was then heated at 45° C. for 6 hours to afford a gel. The soaked CFP was then taken out and the gel on the surface of CFP was wiped off. Subsequently, this soaked CFP was further heated at 110° C. for 12 h to trigger the in-situ polymerization of PPN in the CFP matrix. After the reaction was completed, the sample was washed by DMF and ethanol. It was then soaked again in the same monomer 1/MSA solution and heated to 110° C. after 6 hours of pre-treatment. Such "soaking-heating-washing" cycles were performed for 4 times to reach a high loading of PPN in the CFP matrix. See FIG. 20, FIG. 21, and FIG. 22

Example 11

Potential Procedure for Other PPN/CFP Composite

Using the similar procedure described above in Example 10, composites of CFP with any PPN claimed in this patent application can be processed through the "soaking-heating-washing" cycles, using a solution of the corresponding diacetyl-functionalized monomer in MSA (80~100 mg/mL). For example, the CFP was soaked in PPN precursor solution in MSA. The mixture was heated at 45° C. for 6 h when gel formed. The composite was then taken out and the gel on the surface was removed. Subsequently, the composite was heated at 110° C. for 12 h followed by washed with DMF and ethanol. The procedure was repeated on composite for 3-6 times to give a high loading of PPN.

Example 12

Morphology Study of PPN1/CFP

SEM (FEI Quanta 600 FE-SEM) was used to study morphology of PPN/CFP with voltage of 20 kV and working distance of 11 mm. The surface of samples was coated with a 10-nm layer of Pt/Pd prior to the SEM.

The top view SEM of pristine CFP showed carbon fibers randomly intersected with each other, leaving with lots of voids as large as hundreds micrometer. Through the voids, deeper carbon fibers could be seen. After loading with PPN, those hundreds-micrometer voids in CFP were filled up with PPN. While the superficial carbon fiber can still be seen, deeper carbon fibers was blocked by PPN in the voids. The cross-section view SEM of CFP/PPN showed the tight bond between PPN and carbon fibers. The macroporous features of PPN was not observed in cross-section view SEM of CFP.

See FIG. 23 and FIG. 24

Example 13

Thickness Control

The permeance of PPN filial can be further optimized by decreasing the thickness of the PPN film. The thickness of PPN can be controlled by concentration of monomer solution as well as the thickness of the physical spacer when processing. By tuning these conditions, the PPN film thickness varies from 40 μm to 150 μm.

Example 14

Functional Group Installation and Applications

Special functional group could be introduced by two methods: (1) using monomers containing functional groups so that these functional groups can be carried over to the final PPN structure, or (2) post-polymerization modification of the PPN to install functional groups. Installation of functional groups will lead to applications in adsorption and membrane filtration.
1. Specific Applications for Adsorption:
    a) Installing mercapto, or thioether groups onto the PPN backbone enables the ability to capture heavy metals such as Hg, Pb, Ag, and Cu etc. from water.
    b) Installing nitrogen rich ligands, such as cyclam (1,4, 8,11-tetraazacyclotetradecane), into the PPN enables the ability to capture Ni, Cr, Zn, etc. metal ions.
    c) Installing supramolecular host functionalities, such as cyclodextrin, calixarene to the PPN enables the ability to capture organic small molecules.
2. Specific Applications for Membrane Filtration:
    a) Installing ionic functional groups (such as sulfonate group, ammonium, or imidazolium groups) can modulate the rejection selectivity of the PPN film against solutes with different charges during nanofiltration.

Installing inert groups into the PPN can control the pore size of the film so that the molecular weight cut off can be modulated. The smaller the pore size is, the lower molecular weight cut off for the nanofiltration is.

Thus, specific compositions and methods of methanesulfonic acid mediated solvent free synthesis of conjugated porous polymer networks have been disclosed. It should be apparent, however, to those skilled in the art that many more modifications besides those already described are possible without departing from the inventive concepts herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Although the invention has been described with reference to these preferred embodiments, other embodiments can achieve the same results. Variations and modifications of the present invention will be obvious to those skilled in the art and it is intended to cover in the appended claims all such modifications and equivalents. The entire disclosures of all applications, patents, and publications cited above, and of the corresponding application are hereby incorporated by reference.

REFERENCES

1. Bétard, A. and Fischer, R. A. (2012) "Metal-Organic Framework Thin Films: From Fundamentals to Applications," *Chem. Rev.* 112(2), 1055-1083.
2. Song, Q. et al. (2016) "Porous Organic Cage Thin Films and Molecular-Sieving Membranes," *Adv. Mater.* 28(13), 2629-2637.
3. Zhu, C. and Fang, L. (2014) "Mingling Electronic Chemical Sensors with Supramolecular Host-Guest Chemistry," *Curr. Org. Chem.* 18(15), 1957-1964.
4. Bisbey, R. P. et al. (2016) "Two-Dimensional Covalent Organic Framework Thin Films Grown in Flow," *Am. Chem. Soc.* 138(36), 11433-11436.
5. Knopfmacher, O. et al. (2014) "Highly Stable Organic Polymer Field-Effect Transistor Sensor for Selective Detection in the Marine Environment," *Nat. Commun.* 5, 2954.
6. Xu, et al. (2013) "Conjugated Microporous Polymers: Design, Synthesis and Application," *Chem. Soc. Rev* 42(20), 8012-3031.
7. Yaghi, O. M. et al. (2003) "Reticular Synthesis and the Design of New Materials," *Nature* 423(6941), 705-714.
8. Li, J.-R. et al. (2012) "Metal-Organic Frameworks for Separations," *Chem. Rev,* 112(2), 869-932.
9. Waller, P. et al. (2015) "Chemistry of Covalent Organic Frameworks," *Acc. Chem. Res.* 48(12), 3053-3063.
10. Feng, X. et al. (2012) "Covalent Organic Frameworks," *Chem. Soc. Rev.* 41(18), 6010-6022.
11. Cooper, A. I. (2009) "Conjugated Microporous Polymers," *Adv. Mater* 21(12), 1291-1295.
12. Yuan, D. et al. (2011) "Highly Stable Porous Polymer Networks with Exceptionally High Gas-Uptake Capacities," *Adv. Mater.* 23(32), 3723-3725.
13. Lu, W. et al. (2010) "Porous Polymer Networks: Synthesis, Porosity, and Applications in Gas Storage/Separation," *Chem. Mater.* 22(21), 5964-5972.
14. Sumida. K. et al. (2012) "Carbon Dioxide Capture in Metal-Organic Frameworks," *Chem. Rev.* 112(2), 724-781.
15. Lee, J. et al. (2009) "Metal-Organic Framework Materials as Catalysts," *Chem. Soc. Rev.* 38(5), 1450-1459.
16. Yoon, M. et al. (2012) "Homochiral Metal-Organic Frameworks for Asymmetric Heterogeneous Catalysis," *Chem. Rev,* 112(2), 1196-1231.
17. Li,. J.-R. et al. (2009) "Selective Gas Adsorption and Separation in Metal-Organic Frameworks," *Chem. Soc. Rev.* 38(5), 1477-1504.
18. Weber, J. and Thomas, A. (2008) "Toward Stable Interfaces in Conjugated Polymers: Microporous Poly(P-Phenylene) and Poly(Phenyleneethynylene) Based on a Spirobifluorene Building Block," *J. Am. Chem. Soc.* 130(20), 6334-6335.
19. Chen, L. et al. (2010) "Light-Harvesting Conjugated Microporous Polymers: Rapid and Highly Efficient Flow of Light Energy with a Porous Polyphenylene Framework as Antenna,"*J. Am. Chem, Soc.* 132(19), 6742-6748.
20. Jiang, J.-X. et al. (2007) "Conjugated Microporous Poly(Aryleneethynylene) Networks," *Angew. Chem. Int. Ed.* 46(45), 8574-8578.
21. Jiang, J.-X. et al. (2008) "Synthetic Control of the Pore Dimension and Surface Area in Conjugated Microporous Polymer and Copolymer Networks," *J. Am. Chem. Soc.* 130(24), 7710-7720.
22. Xu, H. et al. (2015) "Stable, Crystalline, Pawns, Covalent Organic Frameworks as a Platform for Chiral Organocatalysts," *Nature Chemistry* 7(11), 905-912.
23. Huang, L. et al. (2003) "Synthesis, Morphology Control, and Properties of Porous Metal-Organic Coordination Polymers," *Microporous Mesoporous Mater* 58(2), 105-114.
24. Smith, M. B. and March, J. (2001) *Advanced Organic Chemistry* (5th Ed.), Wiley Interscience, New York.

25. Elmorsy, S. S. et al. (1991) "The Direct Production of Tri- and Hexa-Substituted Benzenes from Ketones under Mild Conditions," *Tetrahedron Lett.*, 32(33), 4175-4176.

26. Cherioux, F. and Guyard, L. (2001) "Synthesis and Electrochemical Properties of Novel 1,3,5-Tris(Oligothienyl)Benzenes: A New Generation of 3D Reticulating Agents," *Adv. Funct. Mater* 11(4), 305-309.

27. Cao, X.-Y, et al. (2003) "Extended II-Conjugated Dendrimers Based on Truxene," *J. Am. Chem. Soc.* 125(41), 12430-12431.

28. Rose, M. et al. (2011) "A New Route to Porous Monolithic Organic Frameworks Via Cyclotrimerization," *J. Mater. Chem.* 21(3), 711-716.

29. Zhao, Y.-C. et al. (2011) "Thionyl Chloride-Catalyzed Preparation of Microporous Organic Polymers through Aldol Condensation," *Macromolecules* 44(16), 6382-6388.

30. Wisser, F. M. et al. (2014) "Tailoring Pore Structure and Properties of Functionalized Porous Polymers by Cyclotrimerization,"*Macromolecules* 47(13), 4210-4216.

31. Gernon, M. D. et al. (1999) "Environmental Benefits of Methanesulfonic Acid. Comparative Properties and Advantages," *Green Chem.* 1(3), 127-140.

32. Zou, Y et al. (2015) "Solution-Processable Core-Extended Quinacridone Derivatives with Intact Hydrogen Bonds," *Org. Lett* 17(12), 3146-3149.

33. Yuan, S. et al. (2010) "Microporous Polyphenylenes with Tunable Pore Size for Hydrogen Storage," *Chem. Commun.* 46(25), 4547-4549.

34. Medina, D. D. et al. (2014) "Oriented Thin Films of a Benzodithiophene Covalent Organic Framework," *ACS Nano* 8(4), 4042-4052.

35. Medina, D. D. et al. (2015) "Room Temperature Synthesis of Covalent-Organic Framework Films through Vapor-Assisted Conversion," *J. Am. Chem. Soc.* 137(3), 1016-1019.

36. Ray, J. K. et al. (2001) "Molecular Recognition: Studies on the Synthesis of Some Bis Thiophene Carboxamide Derivatives as Ditopic Receptors for Long Chain Dicarboxylic Acids," *Tetrahedron* 57(33), 7213-7219.

37. Li, Y. and Zheng, Y. (2016) "Synthesis and Characterization of a Ferrocene-Modified, Polyaniline-Like Conducting Polymer," *J. Appl. Polym, Sci,* 133(13), n/a-n/a.

38. Stobe. C. et al. (2014) "Synthesis, Chiral Resolution, and Absolute Configuration of C2-Symmetric, Chiral 9,9'-Spirobilluorenes," *Eur. J. Org. Chem.* 2014(29), 6513-6518.

39. Hsiao, T.-S. et al. (2014) "Molecular Design for the Highly-Sensitive Piezochromic Fluorophores with Tri-Armed Framework Containing Triphenyl-Quinoline Moiety," *Dyes Pigm.* 103, 161-167.

40. Karan, S. et al. (2015) "Sub-10 Nm Polyamide Nanofilms with Ultrafast Solvent Transport for Molecular Separation," *Science* 348(6241), 1347.

41. Jimenez-Solomon, M. F. et al. (2012) "High Flux Membranes for Organic Solvent Nanofiltration (Osn)—Interfacial Polymerization with Solvent Activation," *J. Membr. Sci.* 423(Supplement C), 371-382.

42. Villalobos, L. F. et al. (2017) "Cyclodextrin Membranes: Cyclodextrin Films with Fast Solvent Transport and Shape-Selective Permeability (Adv. Mater. 26/2017)," *Adv. Mater.* 29(26), 1606641.

43. Jimenez-Solomon, M. F. et al. (2016) "Polymer Nanofilms with Enhanced Microporosity by Interfacial Polymerization," *Nat. Mater* 15(7), 760-767.

We claim:

1. A method for the preparation of a porous polymer network comprising:

(a) providing:

(i) a plurality of compounds comprising at least one acetyl group, said plurality of compounds comprising at least one compound type selected from the group consisting of:

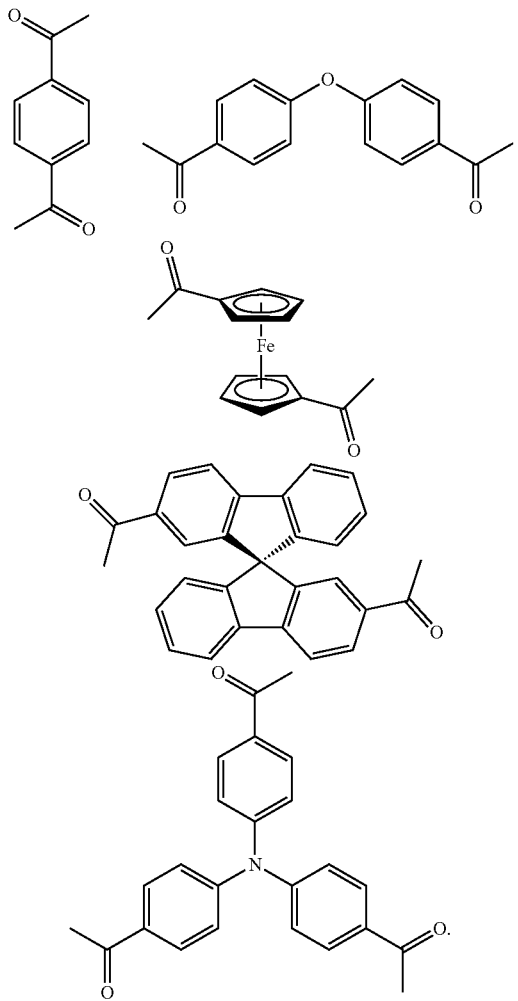

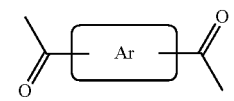

(wherein Ar = any aromatic unit)

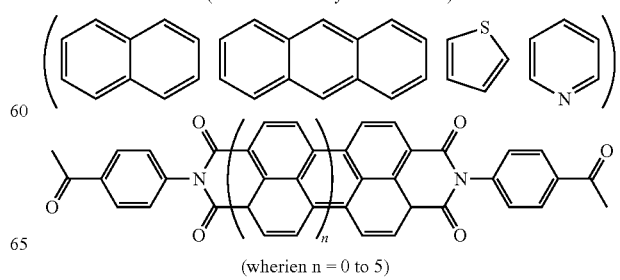

(wherien n = 0 to 5)

51
-continued
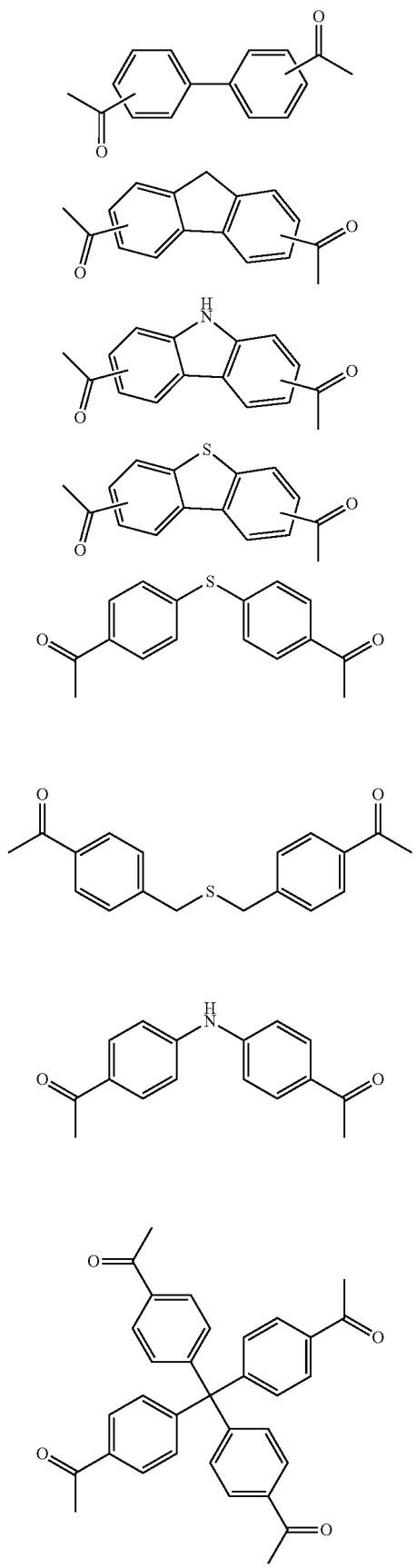
52
-continued
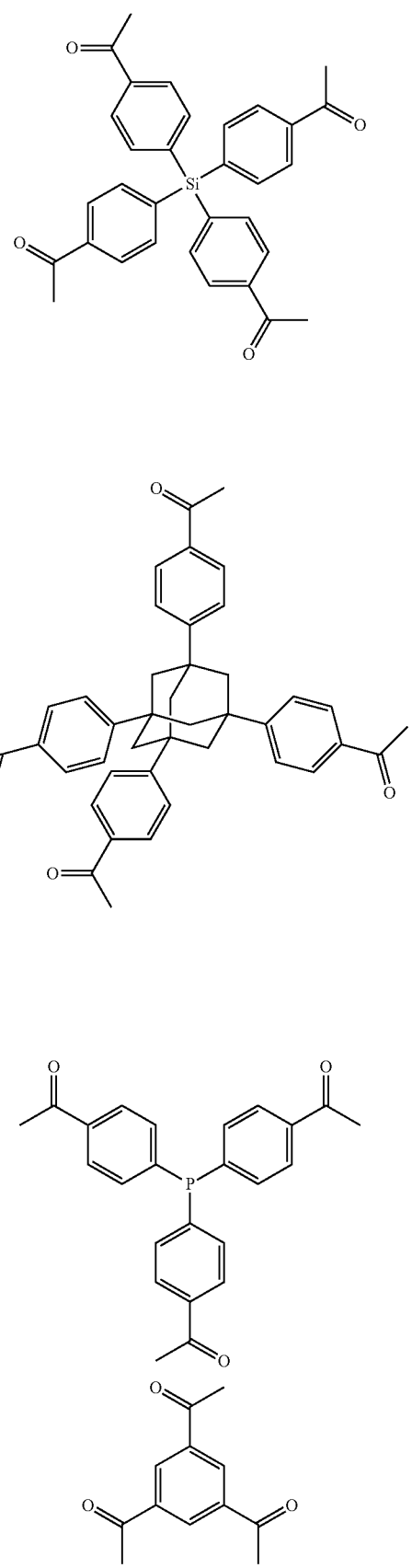

53
-continued
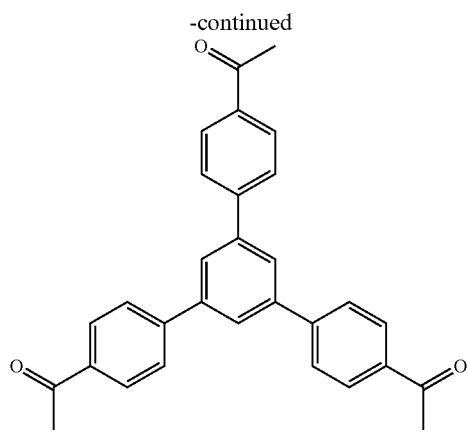
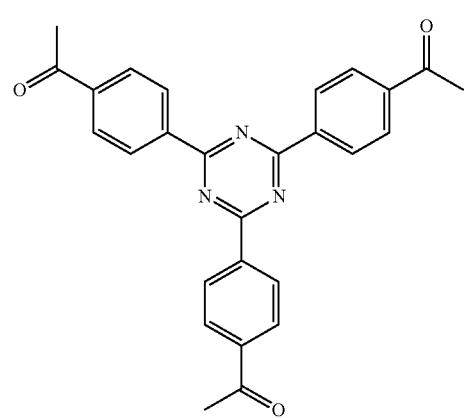
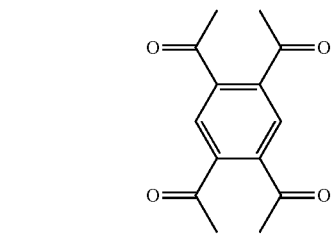
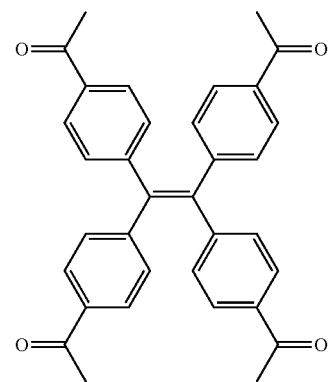
54
-continued
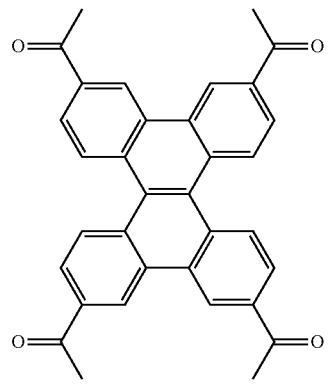
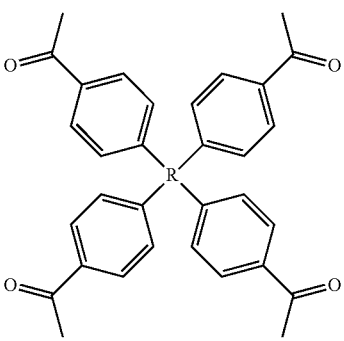
(Square/rectangle)
wherein R =
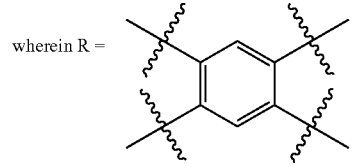
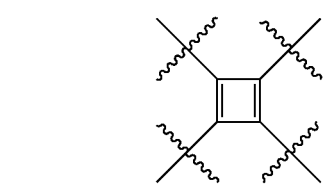
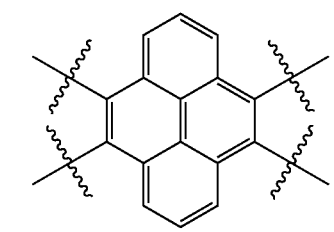

-continued

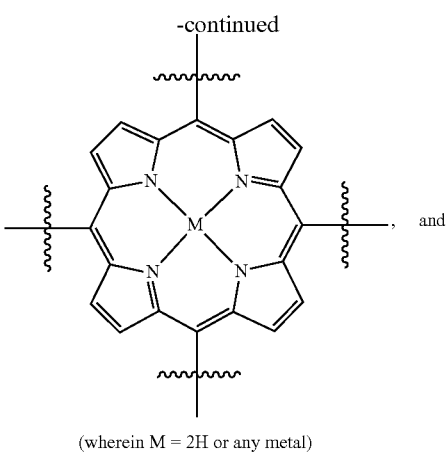, and (wherein M = 2H or any metal)

acetophenone, and (ii) an alkylsulfonic acid, and
(b) treating said compounds so that a reaction occurs to produce the porous polymer network.

2. The method of claim 1, wherein said alkylsulfonic acid is methanesulfonic acid.

3. The method of claim 1, wherein said method is lacking a toxic acid.

4. The method of claim 1, wherein said reaction occurs in open air conditions.

5. The method of claim 1, wherein said method further provides additional elements selected from the group consisting of: carbon nanotubes, metal nanowires, dendritic metal micro/nano-particles, carbon nanofibers, redox active metaloxide nanoparticles, graphene, graphene oxide, and reduced graphene oxide, which become embedded within the porous polymer network after the reaction.

6. The method of claim 1, wherein said method includes more than one compound type.

7. The method of claim 1, wherein said method includes only one compound type comprising at least one acetyl group.

8. The method of claim 1, wherein said reaction comprises an aldol triple condensation.

9. The method of claim 1, wherein said compound comprising at least one acetyl group and said acid are in a homogenous solution at or before step b).

10. The method of claim 1, wherein said compounds and acid are reacted in a temperature range between 40-110° C.

11. The method of claim 1, wherein said method further comprises step (c) wherein said acid is neutralized by aqueous base.

12. The method of claim 11, wherein said method further comprises step (d) wherein said porous polymer network is extracted with an organic solvent.

13. The method of claim 12, wherein said method further comprises step (e) wherein said porous polymer network is purified by flash column chromatography.

* * * * *